(12) United States Patent
Lee et al.

(10) Patent No.: US 10,246,095 B2
(45) Date of Patent: Apr. 2, 2019

(54) REGENERATIVE BRAKING CONTROL APPARATUS FOR VEHICLES

(71) Applicant: LG ELECTRONICS INC., Seoul (KR)

(72) Inventors: Jinkyo Lee, Seoul (KR); Kwangjin Jang, Seoul (KR); Jonghwa Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/671,367

(22) Filed: Aug. 8, 2017

(65) Prior Publication Data

US 2018/0043896 A1 Feb. 15, 2018

(30) Foreign Application Priority Data

Aug. 10, 2016 (KR) ........................ 10-2016-0102043

(51) Int. Cl.
| | |
|---|---|
| *B60W 30/18* | (2012.01) |
| *B60L 7/18* | (2006.01) |
| *B60W 50/08* | (2012.01) |
| *B60W 10/06* | (2006.01) |
| *B60W 10/08* | (2006.01) |
| *B60W 10/184* | (2012.01) |
| *B60W 30/09* | (2012.01) |
| *B60W 30/14* | (2006.01) |

(Continued)

(52) U.S. Cl.
CPC ......... *B60W 30/18127* (2013.01); *B60L 7/18* (2013.01); *B60T 1/10* (2013.01); *B60T 7/18* (2013.01); *B60W 10/06* (2013.01); *B60W 10/08* (2013.01); *B60W 10/184* (2013.01); *B60W 30/09* (2013.01); *B60W 30/143* (2013.01); *B60W 30/18072* (2013.01); *B60W 30/18136* (2013.01); *B60W 30/18145* (2013.01); *B60W 30/18154* (2013.01); *B60W 50/082* (2013.01); *F16D 61/00* (2013.01); *B60L 2240/423* (2013.01); *B60T 7/22* (2013.01); *B60T 2201/022* (2013.01); *B60T 2210/32* (2013.01);

(Continued)

(58) Field of Classification Search
CPC ............... B60L 7/18; B60W 30/18127; B60W 2550/22; B60W 2550/30
See application file for complete search history.

(56) References Cited

U.S. PATENT DOCUMENTS

| | | | | |
|---|---|---|---|---|
| 9,631,940 B2 * | 4/2017 | Eikelenberg | ....... | G01C 21/3469 |
| 9,694,711 B2 * | 7/2017 | Mitsuoka | .......... | B60W 50/0097 |

(Continued)

FOREIGN PATENT DOCUMENTS

| | | |
|---|---|---|
| DE | 102010026769 | 4/2011 |
| DE | 2332795 | 6/2011 |

(Continued)

OTHER PUBLICATIONS

Extended European Search Report and Written Opinion in European Application No. 17171036.1, dated Dec. 12, 2017, 12 pages.

*Primary Examiner* — Todd M Melton
(74) *Attorney, Agent, or Firm* — Fish & Richardson P.C.

(57) ABSTRACT

A regenerative braking control apparatus includes an interface unit configured to receive driving information of a vehicle; an object detection device configured to generate object information based on detecting an object outside the vehicle; and at least one processor. The at least one processor is configured to: determine whether to perform regenerative braking for the vehicle, based on the driving information and the object information; and provide at least one signal corresponding to a result of determining whether to perform the regenerative braking for the vehicle.

19 Claims, 29 Drawing Sheets

(51) Int. Cl.
    *B60T 1/10*     (2006.01)
    *B60T 7/18*     (2006.01)
    *F16D 61/00*     (2006.01)
    *B60T 7/22*     (2006.01)

(52) U.S. Cl.
    CPC .... *B60T 2270/604* (2013.01); *B60W 2540/10* (2013.01); *B60W 2540/12* (2013.01); *B60W 2550/143* (2013.01); *B60W 2550/146* (2013.01); *B60W 2550/22* (2013.01); *B60W 2550/402* (2013.01); *B60Y 2300/18125* (2013.01); *B60Y 2300/89* (2013.01)

(56) References Cited

U.S. PATENT DOCUMENTS

| | | | |
|---|---|---|---|
| 9,827,955 B2 * | 11/2017 | Miller | B60T 1/10 |
| 2014/0046567 A1 | 2/2014 | Schuler | |
| 2015/0019057 A1 | 1/2015 | Morisaki et al. | |
| 2015/0019097 A1 * | 1/2015 | Morisaki | B60L 7/18 |
| | | | 701/70 |
| 2017/0015202 A1 * | 1/2017 | Bryan | B60L 7/18 |

FOREIGN PATENT DOCUMENTS

| | | |
|---|---|---|
| DE | 102011011345 | 9/2012 |
| EP | 2529972 | 12/2012 |
| JP | 2005312109 | 11/2005 |
| JP | 2009189217 | 8/2009 |
| JP | 2010214976 | 9/2010 |
| JP | 2011147294 | 7/2011 |
| JP | 5811148 | 11/2015 |
| WO | 2014/003637 | 1/2014 |
| WO | 2017/097914 | 6/2015 |
| WO | 2015/114430 | 8/2015 |
| WO | 2015/067887 | 5/2017 |

* cited by examiner

REGENERATIVE BRAKING CONTROL APPARATUS FOR VEHICLES

CROSS-REFERENCE TO RELATED APPLICATION

This application claims the benefit of an earlier filing date and right of priority to Korean Patent Application No. 10-2016-0102043, filed on Aug. 10, 2016 in the Korean Intellectual Property Office, the disclosure of which is incorporated herein by reference.

TECHNICAL FIELD

The present disclosure generally relates to a regenerative braking control apparatus for vehicles.

BACKGROUND

A vehicle is an apparatus that moves in a direction desired by a user riding therein. A typical example of the vehicle is an automobile.

A variety of sensors and electronic devices are typically provided in vehicles for convenience of users. For example, for user driving convenience, some vehicles include an Advanced Driver Assistance System (ADAS). As another example, efforts have been made to develop autonomous vehicles.

SUMMARY

Implementations disclosed herein provide a regenerative braking control apparatus for vehicles that performs regenerative braking based on driving information and/or object information.

In one aspect, a regenerative braking control apparatus includes an interface unit configured to receive driving information of a vehicle; an object detection device configured to generate object information based on detecting an object outside the vehicle; and at least one processor configured to: determine whether to perform regenerative braking for the vehicle, based on the driving information and the object information; and provide at least one signal corresponding to a result of determining whether to perform the regenerative braking for the vehicle.

In some implementations, the at least one processor is configured to: based on a determination to perform regenerative braking, determine a regenerative braking start time, a regenerative braking start location, a regenerative braking end time, a regenerative braking end location, a degree of regenerative braking, and whether the degree of regenerative braking has been changed; and provide a first signal, among the at least one signal, corresponding to a result of determining the regenerative braking start time, the regenerative braking start location, the regenerative braking end time, the regenerative braking end location, the degree of regenerative braking, and whether the degree of regenerative braking has been changed.

In some implementations, the driving information includes at least one of vehicle speed information, vehicle route information, or vehicle location information, and the object information includes information regarding at least one of a traffic lamp, a traffic sign, or a traffic marker on a road surface. The at least one processor is configured to determine, based on the vehicle speed information, the vehicle route information, the vehicle location information, and the object information, whether the vehicle is in a state of continuing travel with an acceleration input below a first threshold or a brake input above a second threshold.

In some implementations, the traffic marker on the road surface includes a stop line, and the at least one processor is configured to determine a stop location of the vehicle based on information regarding the stop line.

In some implementations, the at least one processor is configured to: acquire information regarding a distance between the vehicle and the stop location; and determine a regenerative braking start location based on the vehicle speed information and the information regarding the distance between the vehicle and the stop location.

In some implementations, the at least one processor is configured to: receive, through the interface unit, driving mode information; and determine the regenerative braking start location further based on the driving mode information.

In some implementations, the at least one processor is configured to: acquire information regarding an object located between the vehicle and the stop line; and determine the stop location of the vehicle further based on the information regarding the object located between the vehicle and the stop line.

In some implementations, the at least one processor is configured to: acquire information regarding a distance between the vehicle and the object located between the vehicle and the stop line; and determine a regenerative braking start location based on the vehicle speed information and the information regarding the distance between the vehicle and the object located between the vehicle and the stop line.

In some implementations, the at least one processor is configured to determine to perform regenerative braking, in a state in which information regarding an object interfering with driving of the vehicle is acquired and traffic signal information of the traffic lamp is acquired.

In some implementations, the at least one processor is configured to determine not to perform regenerative braking, based on a determination that the vehicle is in a state of continuing travel with the acceleration input being less than the first threshold or the brake input being greater than the second threshold.

In some implementations, the vehicle route information includes route information regarding a left turn or a right turn at an intersection located within a first distance from the vehicle; and the at least one processor is configured to determine not to perform regenerative braking, based on the acceleration input being less than the first threshold or the brake input being greater than the second threshold and based on a determination that the vehicle is allowed to make a left turn or a right turn at the intersection.

In some implementations, the vehicle route information includes information regarding a merging location located within a first distance from the vehicle; and the at least one processor is configured to determine not to perform regenerative braking, based on the acceleration input being less than the first threshold or the brake input being greater than the second threshold and based on not having acquired information regarding detection of a second vehicle merging at the merging location.

In some implementations, the at least one processor is configured to determine to perform regenerative braking, based on the acceleration input being less than the first threshold or the brake input being greater than the second threshold and based on having acquired the information regarding the detection of the second vehicle merging at the merging location.

In some implementations, the vehicle route information includes information regarding a curve in a road located within a first distance from the vehicle; and the at least one processor is configured to: acquire curvature information of the curve; and determine not to perform regenerative braking, based on the acceleration input being less than the first threshold or the brake input being greater than the second threshold and based on the curvature of the curve being less than or equal to a threshold curvature value.

In some implementations, the at least one processor is configured to determine to perform regenerative braking, based on the acceleration input being less than the first threshold or the brake input being greater than the second threshold and based on the curvature of the curve being greater than the threshold curvature value.

In some implementations, the driving information includes vehicle speed information; and the at least one processor is configured to: acquire information regarding a speed limit of a road on which the vehicle is travelling; and determine whether to perform regenerative braking, based on the vehicle speed information and the information regarding the speed limit.

In some implementations, the at least one processor is configured to determine to perform regenerative braking, based on the vehicle travelling at a speed greater than the speed limit.

In some implementations, the driving information includes parking situation information; and the at least one processor is configured to determine to perform regenerative braking, based on the vehicle decelerating and based on the parking situation information indicating that the vehicle is performing a parking operation.

In some implementations, the driving information includes Adaptive Cruise Control (ACC)-on state information; and the at least one processor is configured to determine to perform regenerative braking, based on the vehicle decelerating in an ACC-on state according to the ACC-on state information.

In some implementations, the driving information includes Autonomous Emergency Braking (AEB)-on state information; and the at least one processor is configured to determine to perform regenerative braking based on vehicle being in an AEB-on state according to the AEB-on state information.

The details of other implementations are included in the following description and the accompanying drawings.

DETAILED DESCRIPTION

Figure 1:
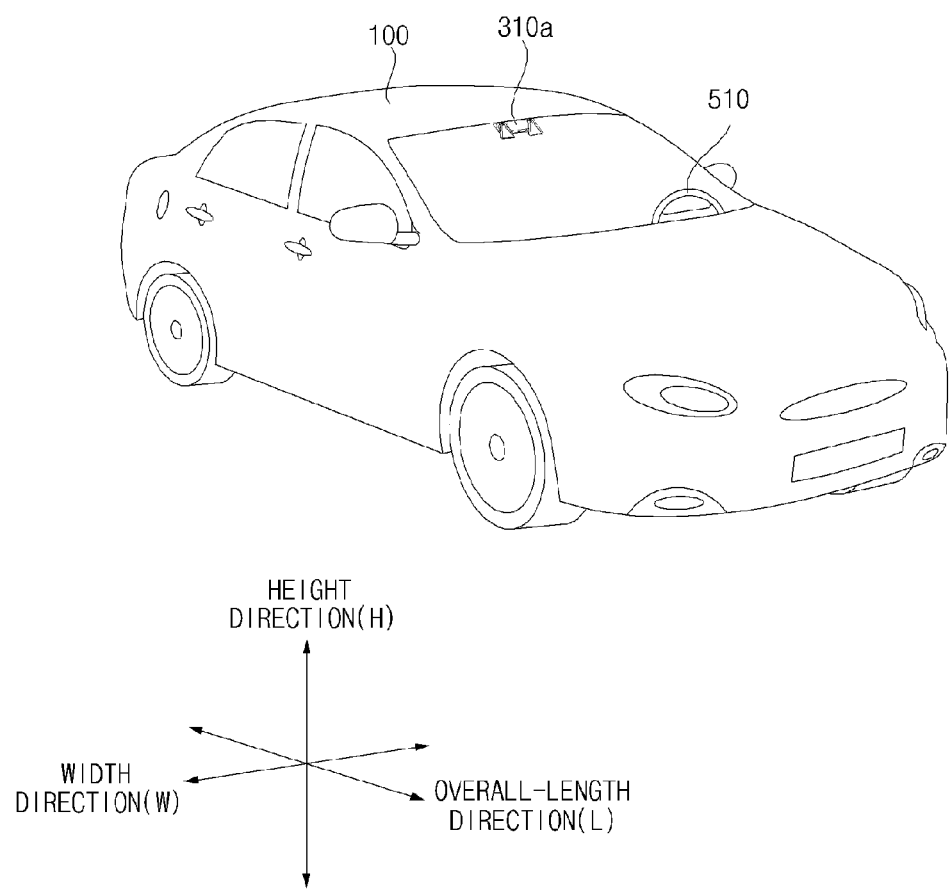
FIG. 1 is a diagram illustrating an example of an external appearance of a vehicle according to some implementations.
Figure 2:
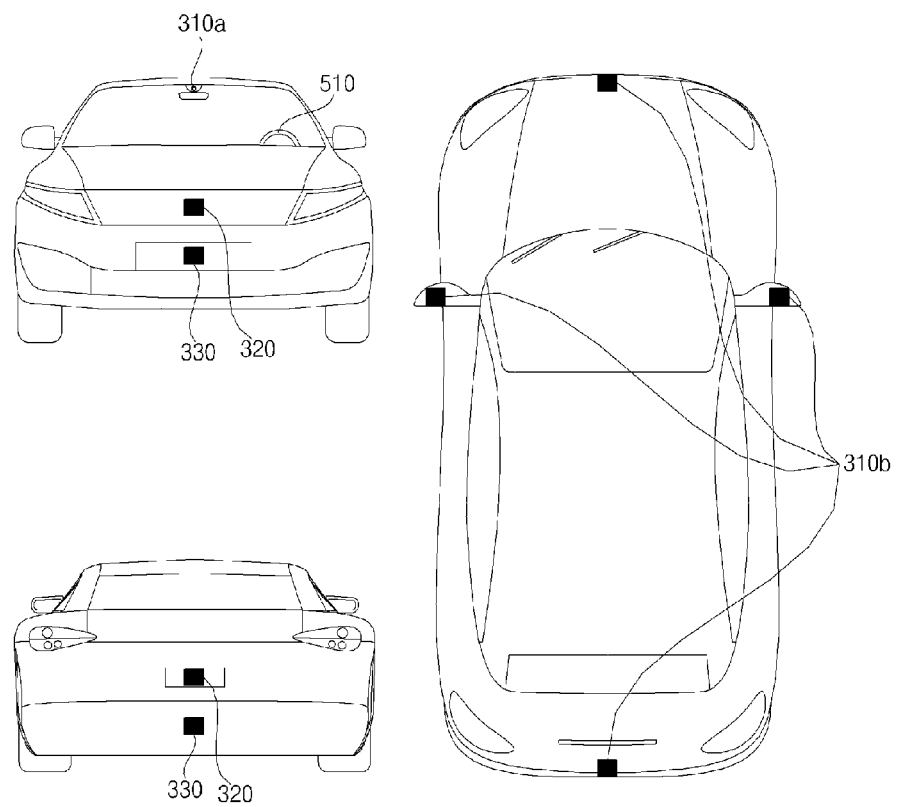
FIG. 2 is a diagram illustrating an example of different angled views of a vehicle according to some implementations.
Figure 3:
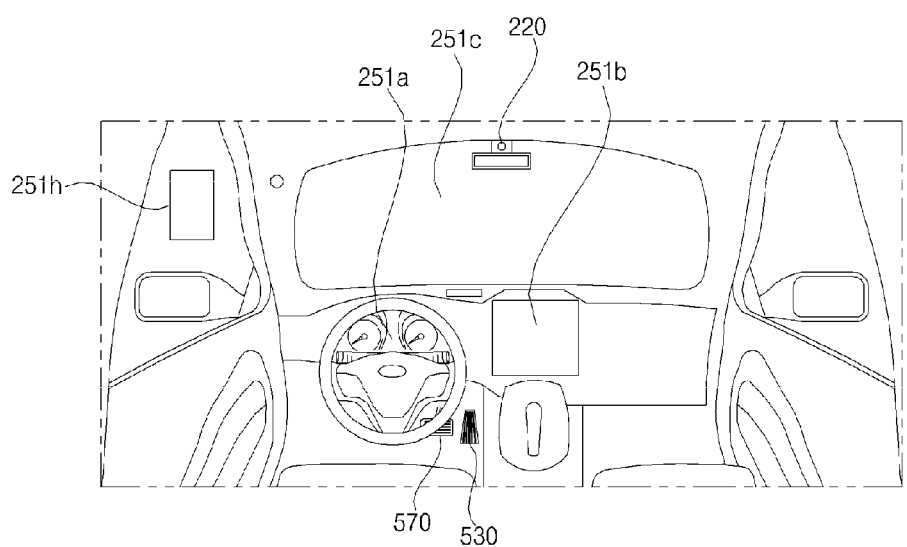
FIGS. 3 and 4 are diagrams illustrating examples of an internal configuration of a vehicle according to some implementations.
Figure 4:
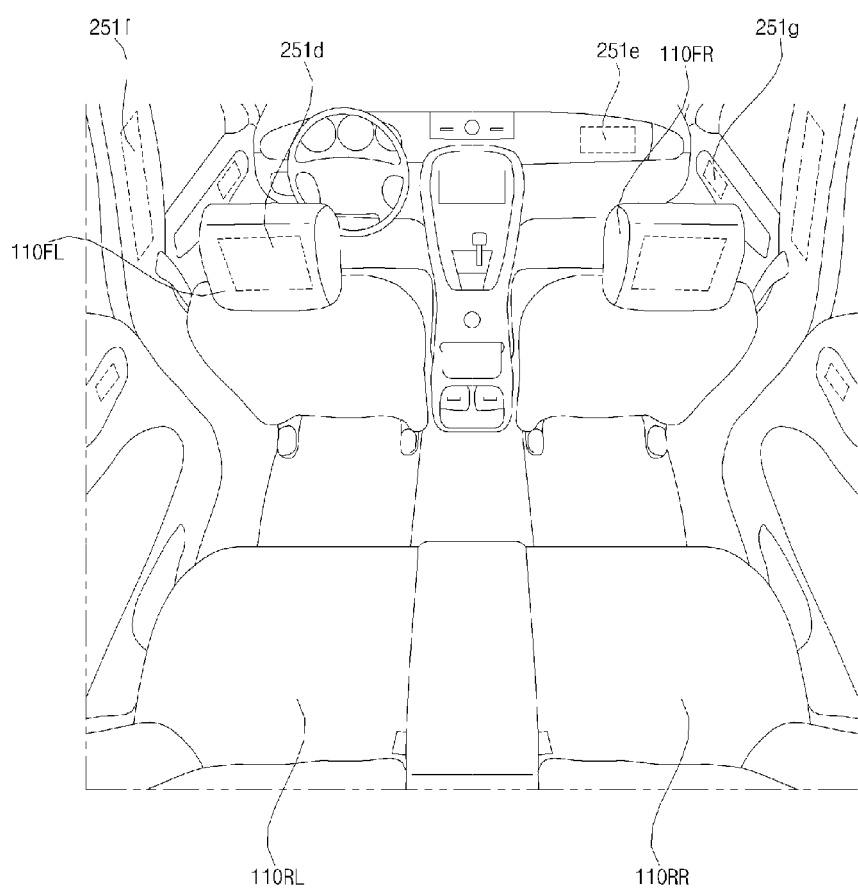

Implementations disclosed herein provide a vehicle with a regenerative braking system. A regenerative braking system is a mechanism that slows down a travelling speed of a vehicle by converting its kinetic energy into a form of energy that can be reused or stored. For example, when a user steps off an accelerator pedal or steps on a brake pedal, the regenerative braking system utilizes a motor to act as a generator that converts kinetic energy of the moving vehicle into electrical energy, which is stored in a battery. As such, the regenerative braking system implements a form of braking for the vehicle by causing the vehicle to slow down by actively reducing its kinetic energy.

However, because a regenerative braking system typically operates based on an on/off state of an accelerator pedal or brake pedal, there is a risk that a regenerative braking operation is activated in scenarios where it should not be performed, such as scenarios where the vehicle is continuously travelling without intending to stop. In such scenarios, activating a regenerative braking operation can result in unnecessary energy consumption. In addition, in some scenarios, regenerative braking is performed in unexpected situations, thereby slowing down the vehicle unexpectedly and leading to incompatibility and discomfort for users.

According to implementations disclosed herein, a regenerative braking control apparatus for vehicles selectively performs regenerative braking based on driving information and/or object information. In some implementations, the regenerative braking control apparatus utilizes driving information of a vehicle, as well as object information regarding an object outside the vehicle, and determines whether to perform regenerative braking based on the driving information and the object information.

As such, a regenerative braking control apparatus may selectively activate a regenerative braking operation in a more selective and intelligent manner based on the situation.

According to some implementations disclosed herein, even when an accelerator input is reduced below a threshold (e.g., accelerator pedal is not stepped on) or even when a brake input is increased beyond a threshold (e.g., a brake pedal is stepped on), regenerative braking is selectively performed only when determined appropriate. As such, in some scenarios, implementations may reduce unnecessary energy consumption and improve energy efficiency.

In addition, in some implementations, when a braking operation is deemed necessary, regenerative braking is performed even without a brake input. As such, in some scenarios, this may improve convenience of a driver.

Furthermore, in some implementations, regenerative braking is controlled so as not to be performed when it is deemed necessary to continue driving without braking or significantly slowing down. As such, in some scenarios, this may mitigate incompatibility caused by the regenerative braking.

A vehicle as described in this disclosure may be any suitable vehicle, such as an automobile or a motorcycle. Hereinafter, description will be given based on examples of an automobile.

A vehicle as described in this disclosure may be powered by any suitable power source and may be, for example, an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

As shown in FIGS. 1 to 7, a vehicle 100 may include a plurality of wheels, which are rotated by a power source, and a steering input device 510 for controlling the direction of travel of the vehicle 100.

In some implementations, the vehicle 100 may be an autonomous vehicle. In some scenarios, the vehicle 100 may be switched between an autonomous driving mode and a manual driving mode, for example in response to a user input. For example, in response to a user input received through a user interface device 200, the vehicle 100 may be switched from a manual mode to an autonomous driving mode, or vice versa.

The vehicle 100 may be switched to the autonomous driving mode or to the manual mode based on driving information. The driving information may be generated based on object information provided by an object detection device 300.

For example, the vehicle 100 may be switched from the manual mode to the autonomous driving mode, or vice versa, based on driving information generated in the object detection device 300. As another example, the vehicle 100 may be switched from the manual mode to the autonomous driving mode, or vice versa, based on driving information received through a communication device 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on control by one or more processors, such as an operation system 700. For example, the autonomous vehicle 100 may operate based on information, data, or signals generated in a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

In the present disclosure, for convenience of explanation, the term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

Figure 7:
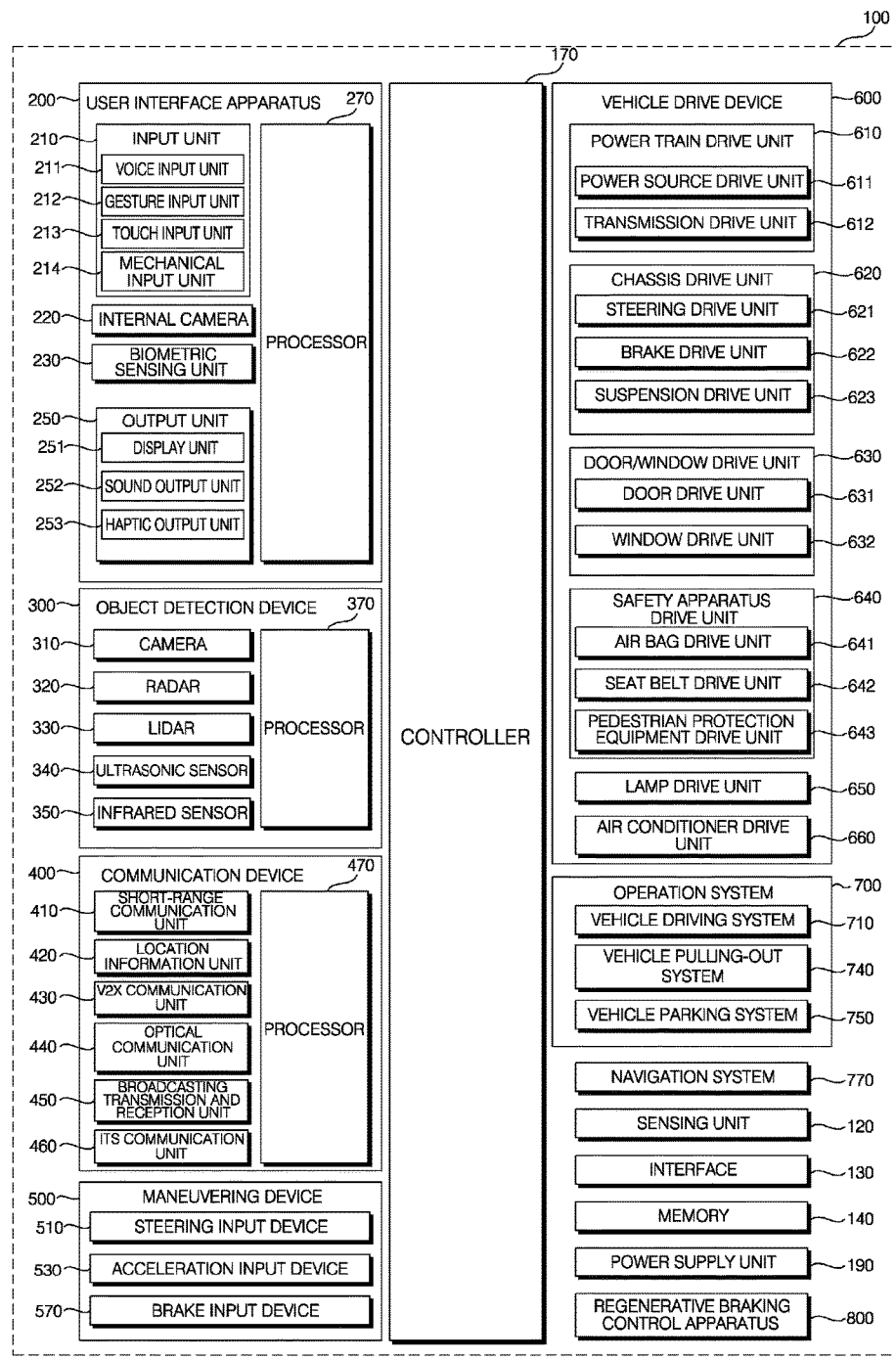
FIG. 7 is a block diagram illustrating an example of a vehicle according to some implementations.

As illustrated in FIG. 7, the vehicle 100 may include the user interface device 200, the object detection device 300, the communication device 400, the maneuvering device 500, a vehicle drive device 600, an operation system 700, a navigation system 770, a sensing unit 120, an interface unit 130, a memory 140, a controller 170, a power supply unit 190, and a regenerative braking control apparatus 800.

In some implementations, the vehicle 100 may further include other components in addition to the aforementioned components, or may not include some of the aforementioned components.

The user interface device 200 is configured to communicate between the vehicle 100 and a user. The user interface device 200 may receive a user input, and provide information generated in the vehicle 100 to the user. The vehicle 100 may implement User Interfaces (UI) or User Experience (UX) through the user interface device 200.

The user interface device 200 may include an input unit 210, an internal camera 220, a bio-sensing unit 230, an output unit 250, and a processor 270.

In some implementations, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be inside the vehicle 100. For example, the input unit 210 may be disposed in one region of a steering wheel, one region of an instrument panel, one region of a seat, one region of each pillar, one region of a door, one region of a center console, one region of a head lining, one region of a sun visor, one region of a windshield, or one region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of optical output units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 213 may be integrally formed with a display unit 251 as one body to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on eye gaze information of the user. The processor 270 may sense a gesture of the user from the images of the inside of the vehicle 100.

The bio-sensing unit 230 may acquire biological information of the user. The bio-sensing unit 230 may include a sensor for acquire biological information of the user, and may utilize the sensor to acquire finger print information, heart rate information, etc. of the user. The biological information may be used for user authentication.

The output unit 250 is configured to generate a visual, acoustic, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in one region 251a of a steering wheel, one region 251b or 251e of an instrument panel, one region 251d of a seat, one region 251f of each pillar, one region 251g of a door, one region of a center console, one region of a head lining, one region of a sun visor, one region 251c of a windshield, or one region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output thereof.

The processor 270 may control the overall operation of each unit of the user interface device 200.

In some implementations, the user interface device 200 may include a plurality of processors 270 or may not include the processor 270.

In a case where the user interface device 200 does not include the processor 270, the user interface device 200 may operate under the control of the controller 170 or a processor of a different device inside the vehicle 100.

In some implementations, the user interface device 200 may be referred to as a display device for vehicles.

The user interface device 200 may operate under the control of the controller 170.

The object detection device 300 is configured to detect an object outside the vehicle 100.

The object may include various objects related to travelling of the vehicle 100.

Figure 5:
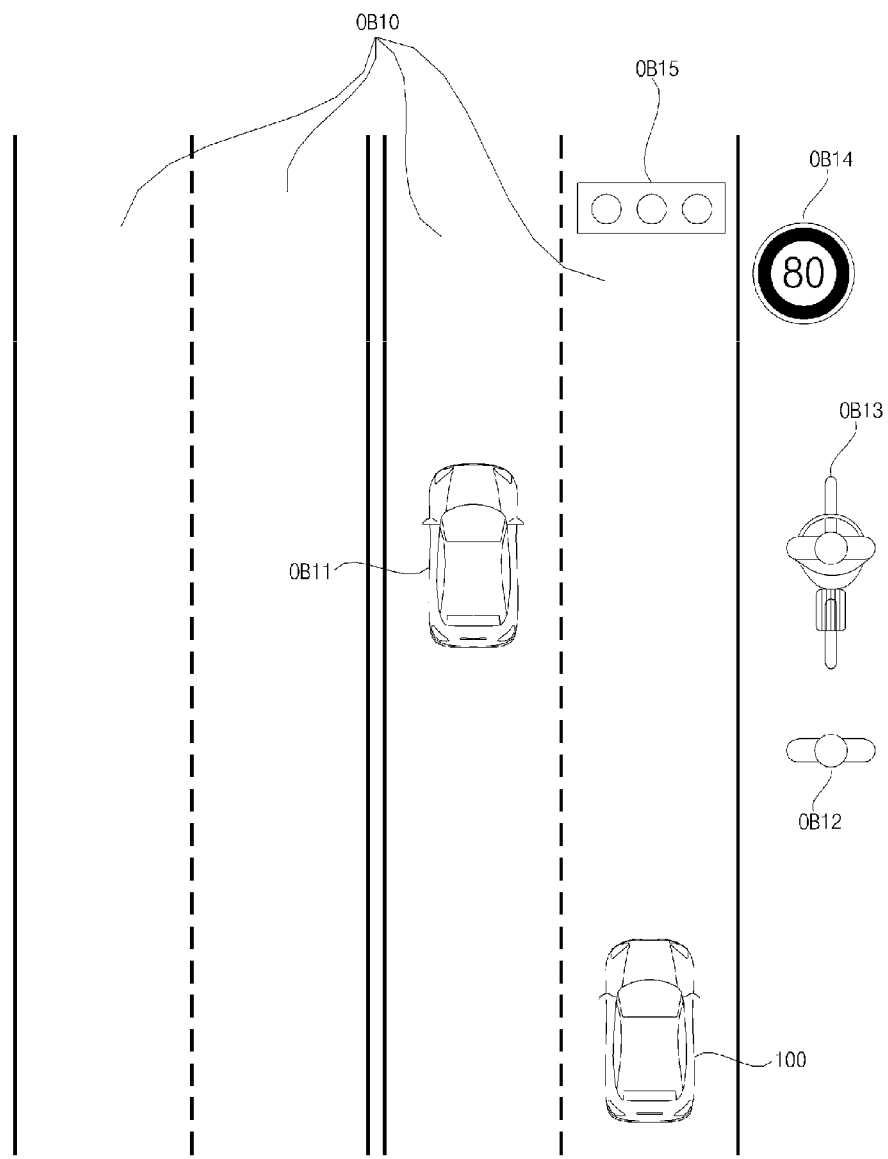
FIGS. 5 and 6 are diagrams illustrating examples of objects detected outside a vehicle according to some implementations.
Figure 6:
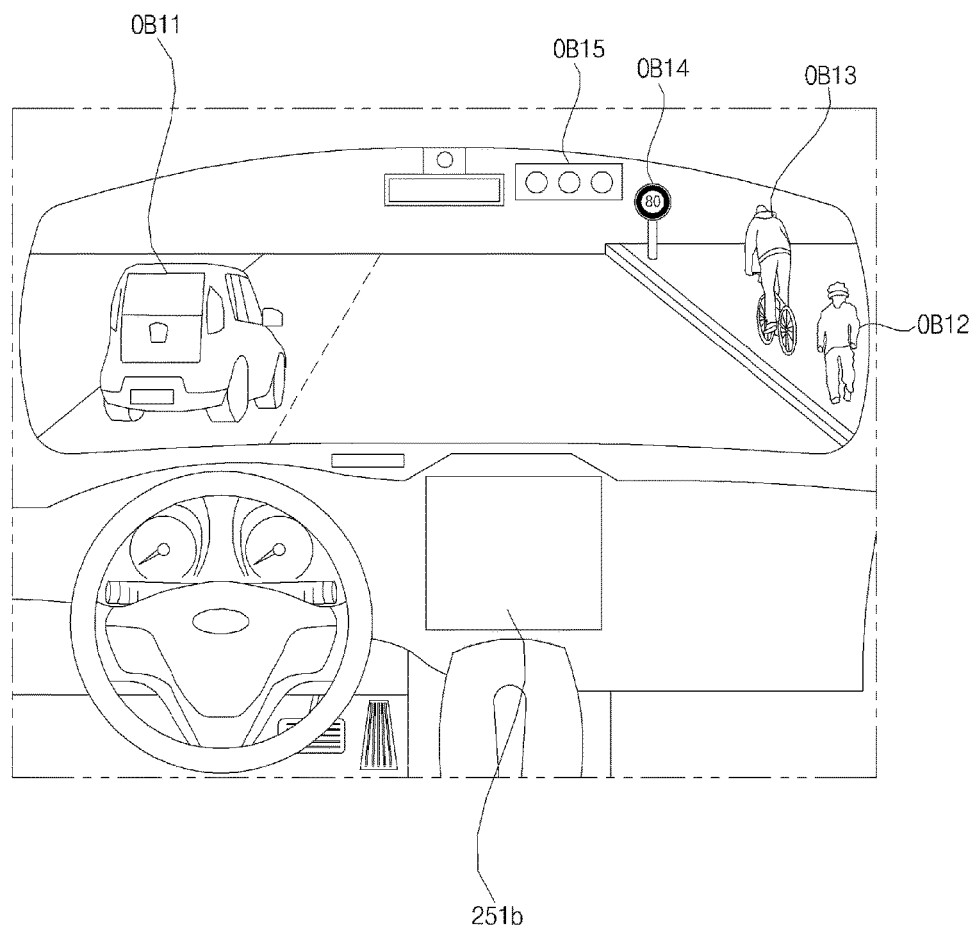

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling or a lane next to the lane in which the vehicle 100 is traveling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

As examples, the traffic signal may include a traffic lamp OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic lamp, and a bridge.

The geographical feature may include a mountain and a hill.

In some implementations, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370.

In some implementations, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

The camera 310 may utilize various image processing algorithms to acquire location information of the object, information on the distance to the object, and information on the speed relative to the object.

For example, the camera 310 may acquire the information on the distance to the object and the information on the speed relative to the object, based on a change in size of the object over time in acquired images.

For example, the camera 310 may acquire the information on distance to the object and the information on the speed relative to the object through a pin hole model or through profiling a road surface.

In another example, the camera 310 may acquire the information on the distance to the object and the information on the speed relative to the object, based on information on disparity between stereo images acquired by the stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect and track an object based on acquired images. The processor 370 may, for example, calculate the distance to the object and the speed relative to the object.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection device 300 may include a plurality of processors 370 or may not include the processor 370. For example, each of the camera 310, the radar 320, the lidar 330, the ultrasonic sensor 340, and the infrared sensor 350 may include its own processor.

In a case where the object detection device 300 does not include the processor 370, the object detection device 300 may operate under the control of the controller 170 or a processor inside the vehicle 100.

The object detection device 300 may operate under the control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcasting transmission and reception unit 450, a ITS communication unit 460, and a processor 470.

In some implementations, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcasting transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some implementations, the communication device 400 may include a plurality of processors 470, or may not include the processor 470.

In a case where the communication device 400 does not include the processor 470, the communication device 400 may operate under the control of the controller 170 or a processor of a device inside of the vehicle 100.

In some implementations, the communication device 400 may implement a vehicle display device, together with the user interface device 200. In this case, the vehicle display device may be referred to as a telematics device or an Audio Video Navigation (AVN) device.

The communication device 400 may operate under the control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be configured as a touchscreen, a touch pad, or a button.

The acceleration input device 530 may receive a user input for acceleration of the vehicle 100. The brake input device 570 may receive a user input for deceleration of the vehicle 100. In some implementations, each of the acceleration input device 530 and the brake input device 570 may take the form of a pedal. In some implementations, the acceleration input device 530 or the break input device 570 may be configured as a touch screen, a touch pad, or a button.

The maneuvering device 500 may operate under the control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety equipment drive unit 640, a lamp drive unit 650, and an air conditioner drive unit 660.

In some implementations, the vehicle drive device 600 may further include other components in addition to the aforementioned components, or may not include some of the aforementioned components.

In some implementations, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under the control of the controller 170.

In a case where an electric motor is the power source, the power source drive unit 611 may control the motor. The power source drive unit 610 may control, for example, the RPM and toque of the motor under the control of the controller 170.

The transmission drive unit 612 may perform control of a transmission.

The transmission drive unit 612 may adjust the state of the transmission. The transmission drive unit 612 may change the transmission to a drive (D), reverse (R), neutral (N), or park (P) state.

In some implementations, in a case where an engine is the power source, the transmission drive unit 612 may adjust a gear-engaged state to the drive (D) state.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may perform control such that a different degree-braking force is applied to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100. The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a seat belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The seat belt drive unit 642 may perform electronic control of a seatbelt apparatus inside the vehicle 100. For example, upon detection of a dangerous situation, the seat belt drive unit 642 may control passengers to be fixed onto seats 110FL, 110FR, 110RL, and 110RR with seat belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle drive device 600 may include its own processor.

The vehicle drive device 600 may operate under the control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, in a case where the operation system 700 is implemented as software, the operation system 700 may be subordinate to the controller 170.

The operation system 700 may include at least one of a user interface device 200, the object detection device 300, the communication device 400, the vehicle drive device 600, or the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

The vehicle pulling-out system 740 may perform a pulling-out operation of the vehicle 100.

The vehicle pulling-out system 740 may perform a pulling-out operation of the vehicle 100 by providing a control signal to the vehicle drive device 600 in response to reception of navigation information from the navigation system 770.

The vehicle pulling-out system 740 may perform a pulling-out operation of the vehicle 100 by providing a control signal to the vehicle drive device 600 in response to reception of object information from the object detection device 300.

The vehicle pulling-out system 740 may perform a pulling-out operation of the vehicle 100 by providing a control signal to the vehicle drive device 600 in response to reception of a signal from an external device.

The vehicle parking system 750 may perform a parking operation of the vehicle 100.

The vehicle parking system 750 may perform a parking operation of the vehicle 100 by providing a control signal to the vehicle drive device 600 in response to reception of navigation information from the navigation system 770.

The vehicle parking system 750 may perform a parking operation of the vehicle 100 by providing a control signal to the vehicle drive device 600 in response to reception of object information from the object detection device 300.

The vehicle parking system 750 may perform a parking operation of the vehicle 100 by providing a control signal to the vehicle drive device 600 in response to reception of a signal from an external device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication device 400.

In some implementations, the navigation system 770 may be classified as a sub-component of the user interface device 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator input degree sensor (e.g., acceleration pedal position sensor), and a brake input degree sensor (e.g., a brake pedal position sensor).

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the degree of acceleration input (e.g., pressure applied to an accelerator pedal), and information about the degree of brake input (e.g., pressure applied to a brake pedal).

The sensing unit 120 may further include, for example, an accelerator input sensor (e.g., accelerator pedal sensor), a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface unit 130 may serve as a passage for various kinds of external devices that are connected to the vehicle 100. For example, the interface unit 130 may have a port that is connectable to a mobile terminal and may be connected to the mobile terminal via the port. In this case, the interface unit 130 may exchange data with the mobile terminal.

In some implementations, the interface unit 130 may serve as a passage for the supply of electrical energy to a mobile terminal connected thereto. When the mobile terminal is electrically connected to the interface unit 130, the interface unit 130 may provide electrical energy, supplied from the power supply unit 190, to the mobile terminal under the control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be implemented as a sub-component of the controller 170.

The controller 170 may control the overall operation of each unit inside the vehicle 100. The controller 170 may be referred to as an Electronic Control Unit (ECU).

The power supply unit 190 may supply power required to operate each component under the control of the controller 170. In particular, the power supply unit 190 may receive power from, for example, a battery inside the vehicle 100.

The regenerative braking control apparatus 800 may control regenerative braking of the vehicle 100. In a case where the vehicle 100 is a hybrid vehicle or an electric vehicle, the regenerative braking control apparatus 800 may control the regenerative braking of the vehicle 100.

Figure 8A:
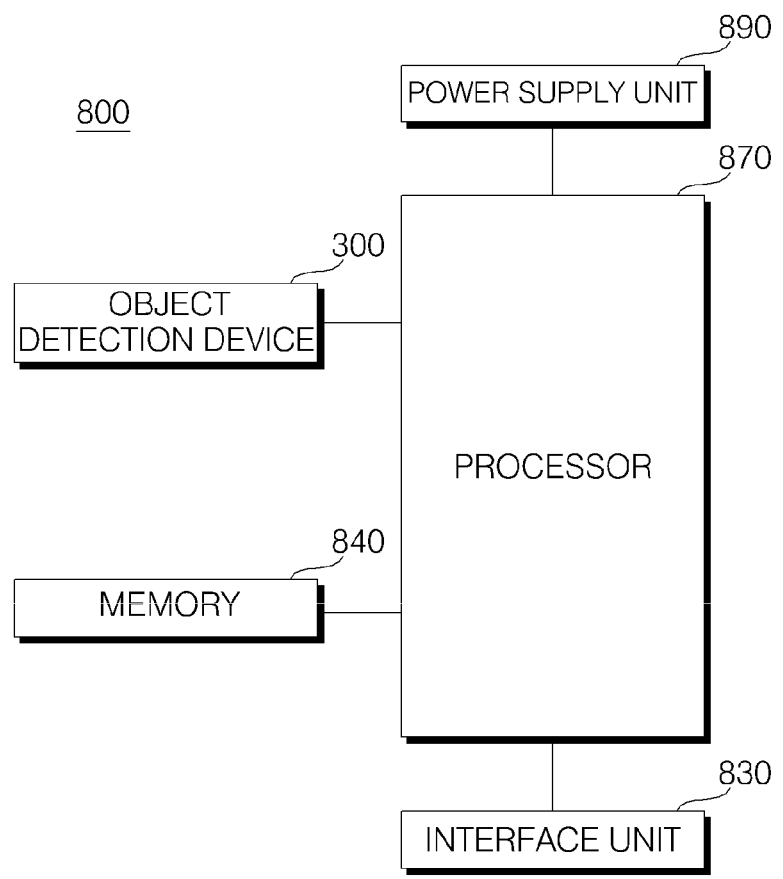
FIG. 8A is a block diagram illustrating an example of a regenerative braking control apparatus for vehicles according to some implementations.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions FIG. 8A is a block diagram illustrating a regenerative braking control apparatus for vehicles according to some implementations.

Referring to FIG. 8A, a regenerative braking control apparatus 800 may include an object detection device 300, an interface unit 830, a memory 840, a processor 870, and a power supply unit 890.

The object detection device 300 may be identical to the object detection device 300 described above with reference to FIGS. 1 to 7.

The object detection device 300 may detect an object outside a vehicle. The object detection device 300 may generate object information.

The object may include at least one selected from among a traffic lamp which induces vehicles to stop, a traffic sign plate, or a traffic sign painted on a road surface.

The interface unit 830 may serve as a passage for various kinds of external devices connected to the vehicle 100.

The interface unit 830 may receive driving information of the vehicle 100. The driving information may include various types of information related to the driving of the vehicle, such as at least one selected from among vehicle speed information, vehicle route information, or vehicle location information.

For example, the interface unit 830 may receive vehicle speed information from the sensing unit 120. As another example, the interface unit 830 may receive navigation information from the navigation system 770. Specifically, the interface unit 830 may receive vehicle route information or vehicle location information from the navigation system 770.

The interface unit 830 may receive driving mode information of the vehicle 100 from a controller 170 or from a user interface device 200 of the vehicle 100. Here, a driving mode may be a mode that is based on various functions of the vehicle 100, selectively implemented by a user, or based on various kinds of driving environment.

For example, the driving mode may operate in an eco mode, a comfort mode, and a sport mode. In another example, the driving mode may be operated in an autonomous driving mode, a manual driving mode, and an unmanned driving mode.

The memory 840 is electrically connected to the processor 870. The memory 840 may store basic data for each unit, control data for the operational control of each unit, and input/output data. The memory 840 may be any of various hardware storage devices, such as a ROM, a RAM, an EPROM, a flash drive, and a hard drive. The memory 840 may store various data for the overall operation of the regenerative braking control apparatus 800, such as programs for the processing or control of the processor 870.

In some implementations, the memory 840 may be integrally formed with the processor 870, or may be implemented as a sub-component of the processor 870.

Based on information about distance between the vehicle 100 and a stop point, the memory 840 may store data that indicates a point or location at which the vehicle 100 should start regenerative braking before the stop point. Such data may be determined, for example, by experimental data and/or may be generated by predictive models.

Based on information about the distance between the vehicle 100 and a stop point and speed information of the vehicle 100, the memory 840 may store data that indicates a point in time at which the vehicle 100 should start regenerative braking before a time of arrival at the stop point. Such data may be determined by experiment data.

The processor 870 may control the overall operation of each unit of the regenerative braking control apparatus 800.

The processor 870 may determine whether to perform regenerative braking based on driving information and/or object information.

The driving information may include, for example, at least one of vehicle speed information, vehicle route information, or vehicle location information.

The object information may relate to, for example, at least one of a traffic lamp directing vehicles to stop, a traffic sign plate, or a traffic sign painted on a road surface.

In some scenarios, when an accelerator input is less than a threshold amount (e.g., acceleration pedal is stepped off) or when a brake input is greater than a threshold amount (e.g., a brake pedal is stepped on), then some regenerative braking systems perform regenerative braking, regardless of driving information and object information. In this case, despite a driver's intention to continue driving, regenerative braking is performed, thereby causing unexpected slowing down of the vehicle and causing a driver to feel a sense of discomfort and incompatibility.

According to some implementations disclosed herein, the regenerative braking control apparatus 800 selectively performs regenerative braking based on driving information and/or object information. As such, the system may reduce unexpected slowing down of a vehicle and a sense of incompatibility that the driver can feel.

When it is determined to perform a regenerative braking operation, the processor 870 may determine various types of information related to performing the regenerative braking operation. For example, the processor 870 may determine a regenerative braking start time and end time, such as times associated with starting and ending the regenerative braking operation, respectively. As another example, the processor 870 may determine a regenerative braking start point and end point, such as relative or absolute locations associated with starting and ending the regenerative braking operation, respectively. The processor 870 may also determine a degree of regenerative braking, such as an indication how much of the kinetic energy of the vehicle is converted into storable energy. The processor 870 may also determine whether the degree of regenerative braking has been changed.

The processor 870 may determine these various type of information based on the driving information and/or the object information detected for the vehicle. The processor 870 may then provide a signal corresponding to a result of the determination of such information for the regenerative braking operation.

As such, some implementations disclosed herein not only adaptively control whether to perform regenerative braking, but also adaptively control one or more parameters of the regenerative braking operation, based on driving information and object information for the vehicle.

For example, when performing a braking operation, the processor 870 may adaptively control the regenerative braking start time, the regenerative braking start point, the regenerative braking end time, the regenerative braking end point, a degree of regenerative braking, and/or whether the degree of regenerative braking has been changed, based on the distance from the vehicle 100 to the stop point and whether any obstacle is located between the vehicle 100 and the stop point. By doing so, the processor 870 may selectively perform regenerative braking only when braking is deemed appropriate, while causing the vehicle 100 to coast when it is appropriate to continue to travel. In this manner, energy efficiency may be improved.

With the processor 870 receives accelerator-off information (e.g., accelerator input less than a threshold) or brake-on information (e.g., brake input greater than a threshold), the processor 870 may further determine whether the vehicle 100 is in a state of continuing travel, based on vehicle speed information, vehicle route information, vehicle location information, and/or object information. As such, when accelerator-off or brake-on information is received, the processor 870 is able to distinguish between scenarios where the vehicle is temporary slowing down while continuing to travel, or whether the vehicle is beginning a substantial slowing or stopping operation.

The accelerator-off information may correspond to the accelerator input being less than a threshold, such as an accelerator pedal being pressed less than a threshold amount. The brake-on information may correspond to the brake input being greater than a threshold, such as a brake pedal being pressed greater than a threshold amount.

In some scenarios, the processor 870 may detect that a traffic sign painted on the road surface includes a stop line. The processor 870 may determine a stop point of the vehicle 100 based on stop line information. For example, the processor 870 may determine a point at a predetermined distance before the stop line as a stop point.

As an example, the processor 870 may detect the stop line based on images acquired from a camera 310. The processor 870 may acquire information on the distance between the vehicle 100 and the stop line. The processor 870 may determine a stop point of the vehicle 100 based on the information on the distance to the stop line.

The processor 870 may acquire information on the distance to the stop point from the vehicle 100. The processor 870 may determine a regenerative braking start point based on vehicle speed information and the information on the distance to the stop point. For example, the processor 870 may determine a regenerative braking start point based on data stored as a table or other data structure in the memory 840.

In some implementations, the driving information may include driving mode information. Here, the driving mode information may be a mode that is based on various functions of a vehicle, which are selectively implemented by a user, or based on various kinds of driving environment of the vehicle 100.

The processor 870 may determine a regenerative braking start time or a regenerative start point based on the driving mode information.

For example, the processor 870 may determine a different regenerative braking start point, depending on whether a driving mode of the vehicle 100 is an eco mode, a comfort mode, is a sport mode.

In another example, the processor 870 may determine a different regenerative braking start point, depending on whether a driving mode of the vehicle 100 is an autonomous driving mode, a manual driving mode, or an unmanned driving mode.

The processor 870 may acquire obstacle information that indicates information about an obstacle located between the vehicle 100 and the stop line. Here, the obstacle may be a nearby vehicle, a pedestrian, a two-wheeled vehicle, or any other obstacle which may be present on the road.

The processor 870 may acquire the obstacle information based on object information generated in the object detection device 300.

In some implementations, the processor 870 may determine a stop point of the vehicle 100 based on the obstacle information. In a case where an obstacle is detected between the vehicle 100 and a stop line, the vehicle 100 may be controlled to stop before colliding with the obstacle. In this case, the processor 870 may determine a specific location located before the stop line as a stop point of the vehicle 100, thus helping to prevent a collision with the obstacle.

The processor 870 may acquire information on the distance to the obstacle. For example, the processor 870 may acquire the information on the distance to the obstacle based on object information generated in the object detection device 300.

The processor 870 may determine a regenerative braking start time or a regenerative braking start point based on speed information of the vehicle 100 and the information to the distance to the obstacle.

In some implementations, the processor 870 may acquire traffic signal information. For example, the processor 870 mat acquire "Go" signal information of a traffic lamp through the object detection device 300.

The processor 870 may acquire information on an obstacle that interferes with driving the vehicle 100. For example, through the object detection device 300, the processor 870 may acquire information on a nearby vehicle that encroaches a lane in which the vehicle 100 is travelling. In this case, the processor 870 may determine to perform regenerative braking.

In a case where information about an obstacle interfering with driving of the vehicle 100 is received, the vehicle 100 may be braked even when traffic signal information has been acquired. In this case, regenerative braking is controlled to be performed, a braking force of the vehicle 100 is increased, and, in turn, the braking distance of the vehicle 100 may be reduced.

In some scenarios, even with accelerator-off information (e.g., accelerator pedal pressed less than a threshold) or brake-on information (e.g., brake pedal pressed greater than a threshold) being received, the processor 870 may determine that the vehicle 100 should continue to travel, based on navigation information, for example, based on vehicle location information and/or vehicle route information. In this case, the processor 870 may determine not to perform regenerative braking.

In a case where a user temporarily reduces an acceleration input (e.g., steps off an accelerator pedal) or temporarily increases a brake input (e.g., steps on a brake pedal) when the vehicle 100 continues to travel, if the vehicle 100 performs regenerative braking and subsequently accelerates, then more energy may be wasted than energy to be stored. In addition, in this case, the user may feel a sense of incompatibility and discomfort due to unexpected slowing or lag of the vehicle caused by regenerative braking. Thus, by not performing regenerative braking in such a case, implementations disclosed herein may reduce unnecessary energy consumption and improve ride comfort.

As an example, the vehicle's route information may indicate making a left turn or a right turn at an intersection that is within a predetermined distance from the vehicle 100. In particular, through the object detection device 300, the processor 870 may receive information indicating a left-turn "Go" signal or a right-turn "Go" signal of a traffic lamp located at an intersection. Such information may indicate that the vehicle is likely to continue travelling and turn at the intersection, rather than stopping at the intersection.

In such scenarios of making a turn at an intersection, the processor 870 may receive accelerator-off information or brake-on information, indicating that the vehicle is being slowed to make the turn at the intersection. However, despite receiving such accelerator-off or brake-on information, the processor 870 may determine not to perform regenerative braking, based on the route information indicating that the vehicle is likely to continue travelling by turning through the intersection.

As such, even when a user decreases an acceleration input (e.g., steps off an accelerator pedal) or increases a brake input (e.g., steps on a brake pedal), the vehicle 100 may utilize other types of information, such as route information, to adaptively determine whether to perform regenerative braking. Accordingly, in the example above, even if a vehicle is decelerated at an intersection to make a left turn or a right turn, the vehicle 100 may determine that such deceleration is only temporary and that the vehicle 100 will continue to travel. Thus, by not performing regenerative braking in such scenarios, the vehicle 100 may reduce unnecessary energy consumption and improve driving convenience and comfort.

In some scenarios, the vehicle route information of the vehicle 100 may include information regarding a merging point within a predetermined distance from the vehicle 100. In a case where accelerator-off information (e.g., accelerator input is less than a threshold) or brake-on information (e.g., brake input is greater than a threshold) is received while information on detection of a nearby vehicle merging at a merging point is not acquired, the processor 870 may determine not to perform regenerative braking. As such, despite the vehicle 100 approaching a merging point, the lack of any vehicles that are actually merging may indicate that the vehicle 100 will continue travelling, and therefore that regenerative braking should not be performed.

By contrast, in a case where the accelerator-off information or the brake-on information is received while information on detection of a nearby vehicle merging at a merging point is acquired, then the processor 870 may determine to perform regenerative braking. As such, the presence of a vehicle that is actually merging at the merging point may indicate that the vehicle 100 will significantly slow down to accommodate the merging vehicle, and therefore that regenerative braking should be performed.

Therefore, in a case where a vehicle other than the vehicle 100 merges at a merging point ahead of the vehicle 100, the vehicle 100 is likely to reduce the speed. In this case, the vehicle 100 reduces the speed through a regenerative braking operation, so that it is possible to perform braking while saving energy.

In some scenarios, the vehicle route information may include information regarding a curve in the road within a predetermined distance from the vehicle 100. The processor 870 may acquire curvature information of the curve. For example, the processor 870 may acquire curvature information of a curve based on navigation information. In some implementations, the processor 870 may acquire curvature information of a curve from images acquired by the camera 310.

In a case where accelerator-off information (e.g., accelerator input less than a threshold) or brake-on information (e.g., brake input greater than a threshold) is received and it is determined that a curvature of the curve is smaller than a reference value, then the processor 870 may determine not to perform regenerative braking. As such, when the vehicle 100 approaches a curve in the road that is not significantly curved, then the vehicle 100 may determine not to perform the regenerative braking and instead allow the vehicle 100 to continue travelling through the curve without significantly slowing down.

By contrast, in a case where accelerator-off information or brake-on information is received and it is determined that the curvature of the curve is greater than a reference value, then the processor 870 may determine to perform regenerative braking. As such, when the vehicle 100 approaches a curve in the road that is significantly curved, then the vehicle 100 may determine that regenerative braking should be performed to significantly slow down the vehicle 100 before going through the curve.

In some implementations, the driving information may include vehicle speed information. The processor 870 may acquire speed limit information on a road on which the vehicle 100 is travelling. For example, the processor 870 may acquire speed limit information based on a detected speed limit sign through the object detection device 300. For example, the processor 870 may acquire speed limit information based on navigation information. For example, the processor 870 may acquire speed limit information from an external device through the communication device 400.

The processor 870 may determine whether to perform regenerative braking, based on vehicle speed information and a speed limit information of a road on which the vehicle 100 is travelling.

For example, when the speed of the vehicle 100 is greater than a speed limit, the processor 870 may determine to perform regenerative braking. In this case, regenerative braking is performed to brake the vehicle 100, so that the vehicle 100 may travel at a speed equal to or less than the speed limit. In this manner, the regenerative braking control apparatus 800 may enable storing energy while reducing the speed.

In some implementations, the driving information may include parking situation information. When the speed of the vehicle 100 is reduced for a parking operation, the processor 870 may determine to perform regenerative braking.

In the parking operation, the vehicle 100 may be braked through a regenerative braking operation, not by a break apparatus, so that the regenerative braking control apparatus 800 may enable storing energy while reducing the speed.

In some implementations, the vehicle 100 may include an advanced driver assistance device that performs various driver assistance functions. For example, the advanced driver assistance device may perform an Adaptive Cruise control (ACC) function, and an Autonomous Emergency Braking (AEB) function.

In such implementations, the processor 870 may determine whether to perform regenerative braking, based on a function of the advanced driver assistance device.

The driving information may include ACC-on state information. When the vehicle 100 decelerates in an ACC-on state in order to adjust the distance to a following vehicle or to travel at a preset speed or less, the processor 870 may determine to perform regenerative braking.

The driving information may include AEB-on state information. In an AEB-on state, the processor 870 may determine to perform regenerative braking.

The processor 870 may provide a signal corresponding to a determination as to whether to perform regenerative braking. For example, the processor 870 may provide a signal corresponding to a determination as to whether to perform regenerative braking to a controller 170 of the vehicle 100.

Figure 8B:
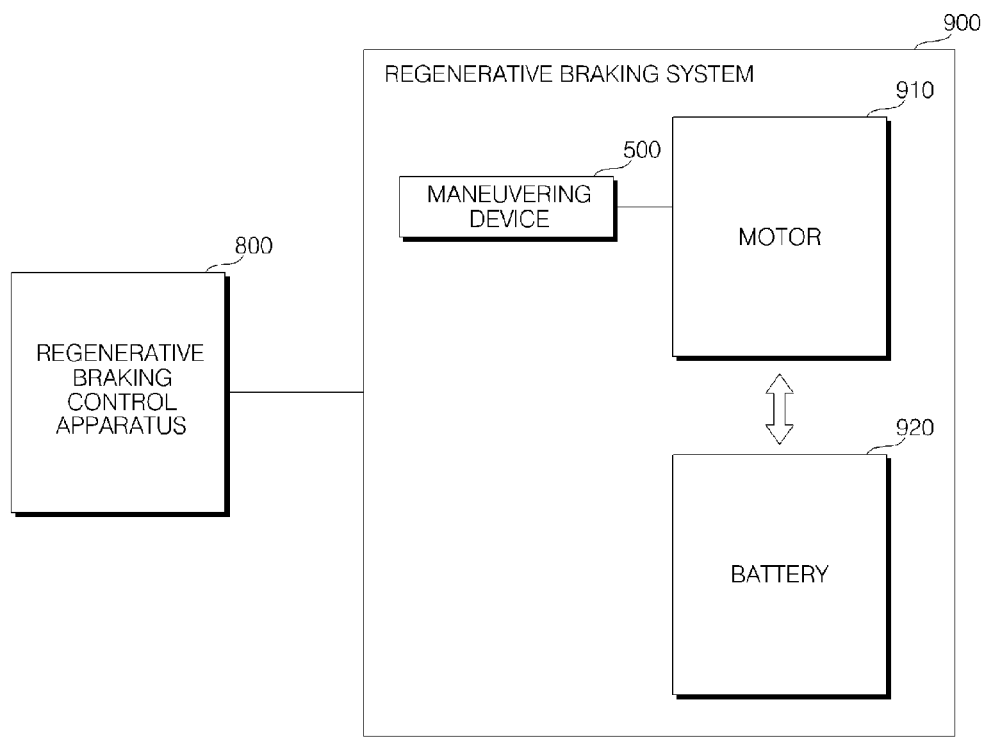
FIG. 8B is a block diagram illustrating an example of a regenerative braking system according to some implementations.

As another example, the processor 870 may provide a signal corresponding to a determination as to whether to perform regenerative braking to a regenerative braking system provided in the vehicle 100 (the system which is indicated by reference numeral 900 in FIG. 8B).

Under the control of the processor 870, the power supply unit 890 may supply power required to operate each component. In particular, the power supply unit 890 may be supplied with power from an in-vehicle battery.

FIG. 8B is a block diagram illustrating a regenerative braking system according to some implementations. Referring to FIG. 8B, a regenerative braking system 900 may include a maneuvering device 500, a motor 910, and a battery 920.

When an acceleration input is received through an acceleration input device 530 included in the maneuvering device 500, the regenerative braking system 900 may act as a power source of the vehicle 100.

In a case where an acceleration input through the acceleration input device 530 included in the maneuvering device 500 is released or decreases below a threshold (for example, when an accelerator pedal is not stepped on), the regenerative braking system 900 enables a motor to act as a generator so as to convert kinetic energy into electrical energy and store the electrical energy in the battery 920.

Alternatively, in a case where a brake input is received through a brake input device 570 included in the maneuvering device 500 (for example, when a brake pedal is stepped on), the regenerative braking system 900 enables a motor to act as a generator so as to convert kinetic energy into electrical energy and store the electrical energy in the battery 920.

The regenerative braking system 900 may be under the control of a regenerative braking control apparatus 800.

For example, in a case where an acceleration input through the acceleration input device 530 is less than a threshold or a brake input is greater than a threshold is received through the brake input device 570 during driving of vehicle 100, regenerative braking may be performed by determination of the processor 870.

Alternatively, in a case where an acceleration input through the acceleration input device 530 is released or a brake input is received through the brake input device 570 during driving of the vehicle 100, regenerative braking may not be performed by determination of the processor 870.

In some implementations, in order to prevent regenerative braking from being performed when an acceleration input through the acceleration input device 530 is released or a brake input is received through the brake input device 570, a stator may be allowed to rotate by the rotation of a rotor upon rolling movement of a wheel.

In some implementations, in order to prevent regenerative braking from being performed when an acceleration input through the acceleration input device 530 is released or a brake input is received through the brake input device 570, a clutch may be provided between a wheel and the motor 910 and controlled to disconnect the wheel from the motor 910.

Figure 9:
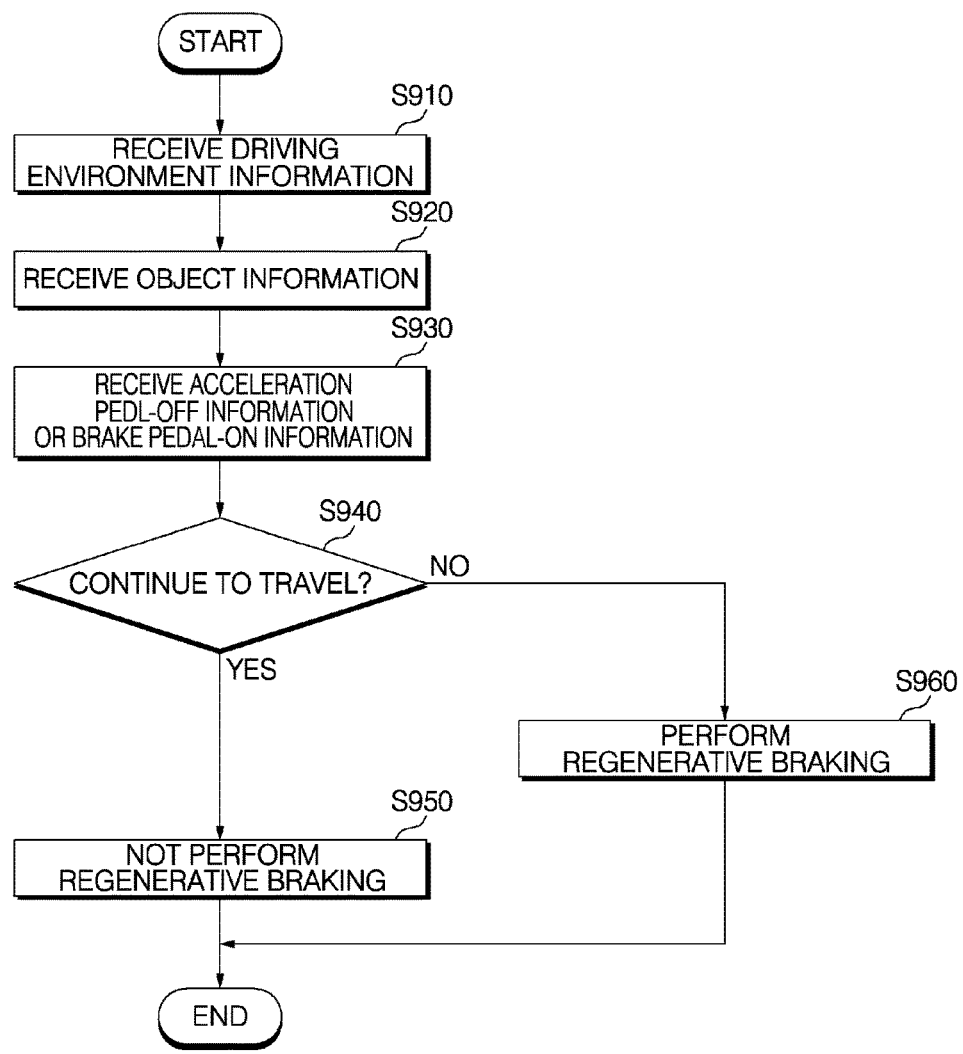
FIG. 9 is a flowchart illustrating an example of an operation of a regenerative braking system according to some implementations.

FIG. 9 is a flowchart for explanation of the operation of the regenerative braking system according to some implementations.

Referring to FIG. 9, the processor 870 may receive driving information through the interface unit 830 in S910.

The processor 870 may receive driving information from the sensing unit 120 or the navigation system 770.

The driving information may include, for example, speed information, route information, and/or location information regarding a vehicle 100.

The driving information may further include driving mode information, parking situation information, ACC-on state information, and AEB-on state information.

The processor 870 may receive object information from the object detection device 300 in S920.

The object information may include stop line information, information on the distance between the vehicle 100 and a stop line, traffic lamp information, traffic sign plate information, obstacle location information, and information on the distance between the vehicle 100 and an obstacle.

The processor 870 may receive accelerator-off information (e.g., accelerator input less than a threshold) or brake-on information (e.g., brake input greater than a threshold) in S930.

The accelerator-off information may be information indicating a state that a user releases or decrease an accelerator input below a threshold (e.g., steps off an accelerator pedal in the middle of pressing the acceleration pedal).

The brake-on information may be information indicating a state that a user increases a brake input beyond a threshold (e.g., stepping on a brake pedal).

In a case where the accelerator-off information or the brake-on information is received, the processor 870 may further determine whether the vehicle 100 is in a state of continuing travel in S940, based on driving information and/or object information.

In a case where it is determined that the vehicle 100 is in a state of continuing travel with the accelerator-off or the brake-on information being received, the processor 870 may determine not to perform regenerative braking in S950.

In a case where it is not determined that the vehicle 100 is in the state of continuing travel with the accelerator-off or the brake-on being received, the processor 870 may determine to perform regenerative braking in S960.

Figure 10:
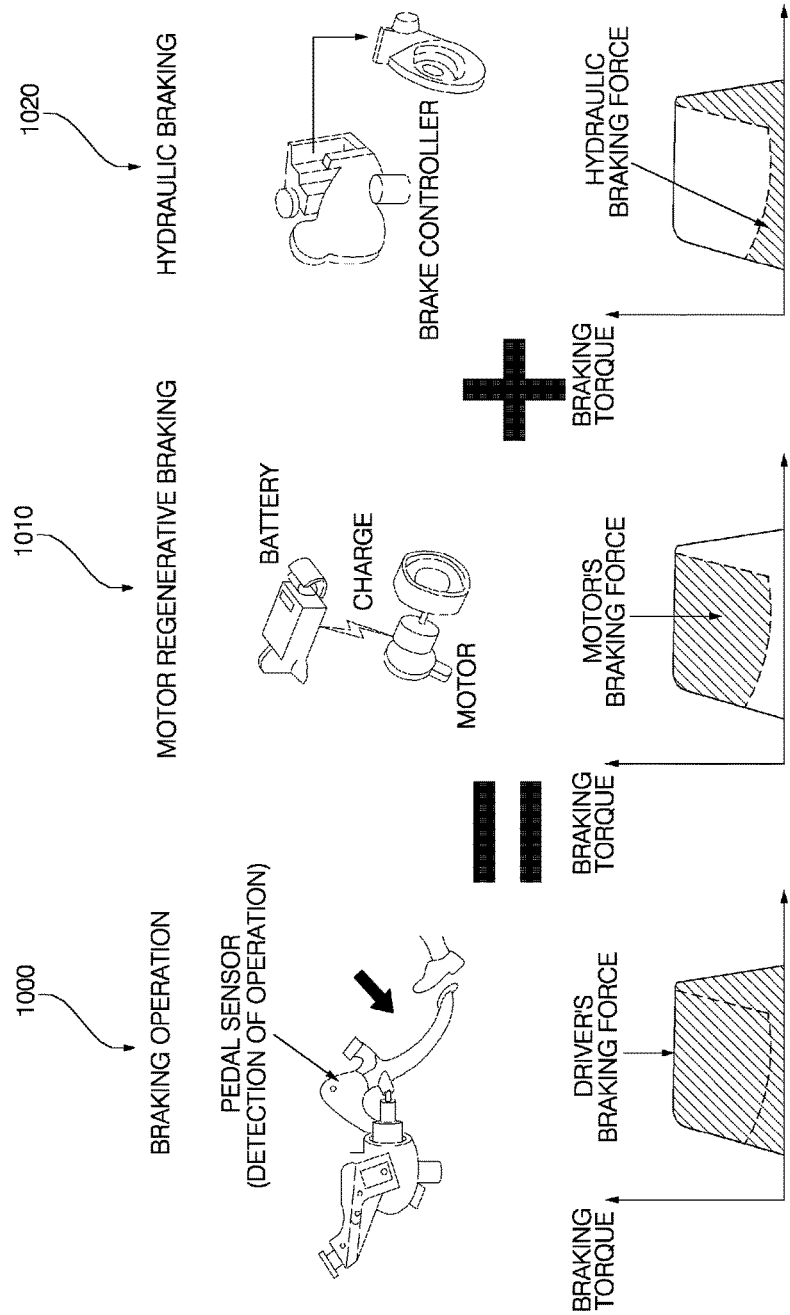
FIG. 10 is a diagram illustrating an example of a vehicle braking operation according to some implementations.

FIG. 10 is a diagram of a vehicle braking operation according to some implementations.

Referring to FIG. 10, an entire braking force 1000 applied to a vehicle 100 may be expressed as a sum of a regenerative braking force 1010 and a braking force 1020 applied by a brake apparatus (for example, a hydraulic braking force).

If a user reduces an acceleration input below a threshold (e.g., steps off an accelerator pedal) and increases a brake input beyond a threshold (e.g., steps on a brake pedal) during driving the vehicle 100, then both the regenerative braking force 1010 and the braking force 1020 by the brake apparatus are applied to the vehicle 100.

In a case where regenerative braking is not performed under the control of the processor 870 despite the accelerator input being decreased below a threshold (e.g., accelerator pedal being stepped off) or the brake input being increased beyond a threshold (e.g., brake pedal being stepped on), only the braking force 1020 by the brake apparatus may be applied to the vehicle 100.

In a case where regenerative braking is not performed under the control of the processor 870 despite the accelerator input being decreased below a threshold (e.g., accelerator pedal being stepped off), braking force is not applied to the vehicle 100. In this case, the vehicle 100 is caused to coast. Here, coasting may indicate travelling by inertia without power supplied from a power source.

Figure 11:
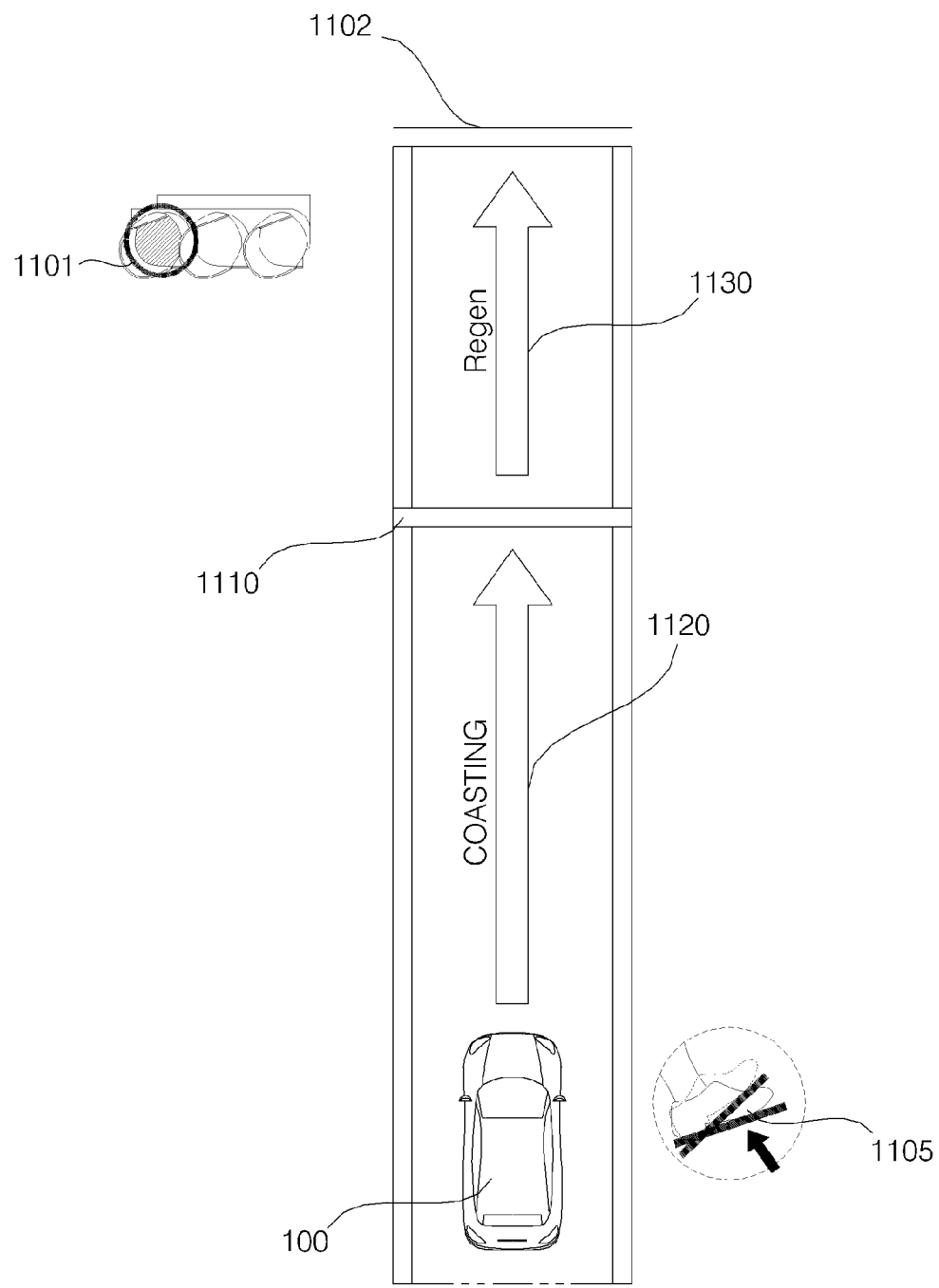
FIG. 11 is a diagram illustrating an example of a regenerative braking control apparatus determining whether to perform regenerative braking, according to some implementations.

FIG. 11 is a diagram of an example of the regenerative braking control apparatus determining whether to perform regenerative braking.

Referring to FIG. 11, the processor 870 may acquire driving information (e.g., through the interface unit 830 of FIG. 8A). Here, the driving information may include, for example, at least one of vehicle speed information, vehicle route information, or vehicle location information.

The processor 870 may acquire object information through the object detection device 300. Here, an object may include at least one of a traffic lamp indicating a stop, a traffic sign plate, or a traffic sign marked on a road surface.

In a case where the accelerator input is decreased below a threshold (e.g., accelerator pedal is stepped off) or the brake input is increased above a threshold (e.g., brake pedal is stepped on), the processor 870 may determine whether the vehicle 100 is in a state of continuing travel, based on the vehicle speed information, the vehicle route information, the vehicle location information, and/or the object information.

For example, in a case where the accelerator input is decreased below a threshold (e.g., accelerator pedal is stepped off) or the brake input is increased above a threshold (e.g., brake pedal is stepped on) while information on a stop signal displayed on a traffic lamp located at an intersection is received, the processor 870 may determine that the vehicle 100 is not in the state of continuing travel. In this case, the processor 870 may determine a stop point of the vehicle 100 based on information on a stop line 1102.

In another example, in a case where the accelerator input is less than a threshold (e.g., pedal is stepped off) or the brake input is greater than a threshold (e.g., pedal is stepped on) while information on a "GO" signal displayed on a traffic lamp located at an intersection is received, the processor 870 may determine that the vehicle 100 is in the state of continuing travel.

As illustrated in FIG. 11, the processor 870 may receive speed information of the vehicle 100 through the interface unit 830.

The processor 870 may acquire information on a signal 1101 displayed on a traffic lamp and information on the stop line 1102 through the object detection device 300.

At the current location of the vehicle 100, the processor 870 may receive accelerator-on information or brake-on information. The accelerator-on information indicates that an accelerator input is greater than a threshold (e.g., accelerator pedal 1105 is stepped off), and the brake-on information indicates that a brake input is greater than a threshold (e.g., a brake pedal is stepped on).

The processor 870 may determine whether to perform regenerative braking, based on the speed information of the vehicle 100, the information on the signal 1101 displayed on the traffic lamp, and/or the information on the stop line 1102 marked on the road. The processor 870 may provide, to the regenerative braking system 900, at least one signal corresponding to a result of the determination.

If it is determined to perform regenerative braking, the processor 870 may determine a regenerative braking start time and a regenerative braking start point 1110.

Based on the speed information of the vehicle 100 and information on the distance between the vehicle 100 and the stop line 1102, the processor 870 may determine a braking distance and a required braking force in order for the vehicle 100 to stop before a stop line 1102.

The processor 870 may determine the regenerative braking start point 1110 based on the determined braking distance and the determined required braking force. In addition, the processor 870 may determine a regenerative braking start time, by considering a relationship of distance, speed, and time.

When the vehicle 100 is not located at the determined regenerative braking start point 1110, the processor 870 may control regenerative braking not to be performed, despite the accelerator input being less than a threshold (e.g., accelerator pedal being stepped off) or the brake input being greater than a threshold (e.g., brake pedal being stepped on). In this case, the vehicle 100 may be operated in a coasting state 1120.

When the vehicle 100 is located at the determined regenerative braking start point 1110, the processor 870 may control the vehicle to operate in a regenerative state 1130 with the accelerator input being less than a threshold (e.g., accelerator pedal being stepped off) or the brake input being greater than a threshold (e.g., brake pedal being stepped on).

The processor 870 may determine a regenerative braking end time, a regenerative braking end point, a degree of regenerative braking, or whether the degree of regenerative braking has been changed, based on the determined braking distance and the determined required braking force. Then, the processor 870 may provide at least one signal corresponding to a result of the determination.

Figure 12A:
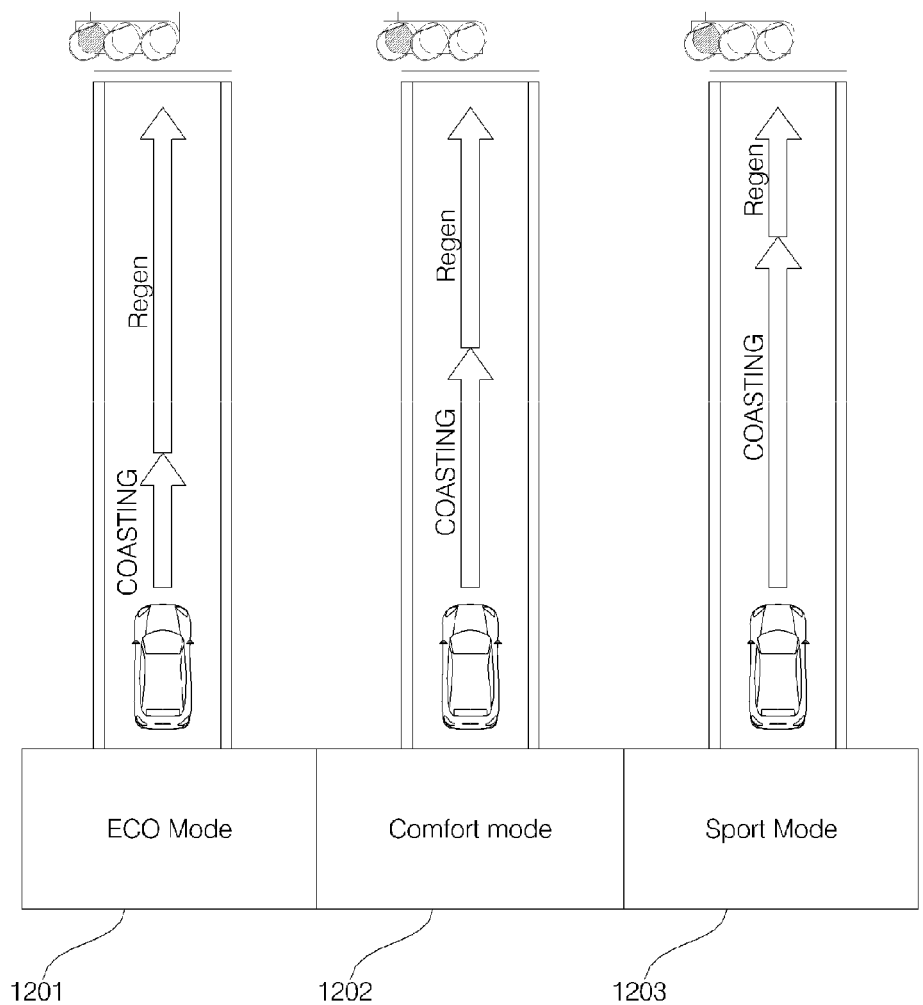
FIGS. 12A and 12B are diagrams illustrating examples of an operation of determining a regenerative braking start point based on driving mode information, according to some implementations.
Figure 12B:
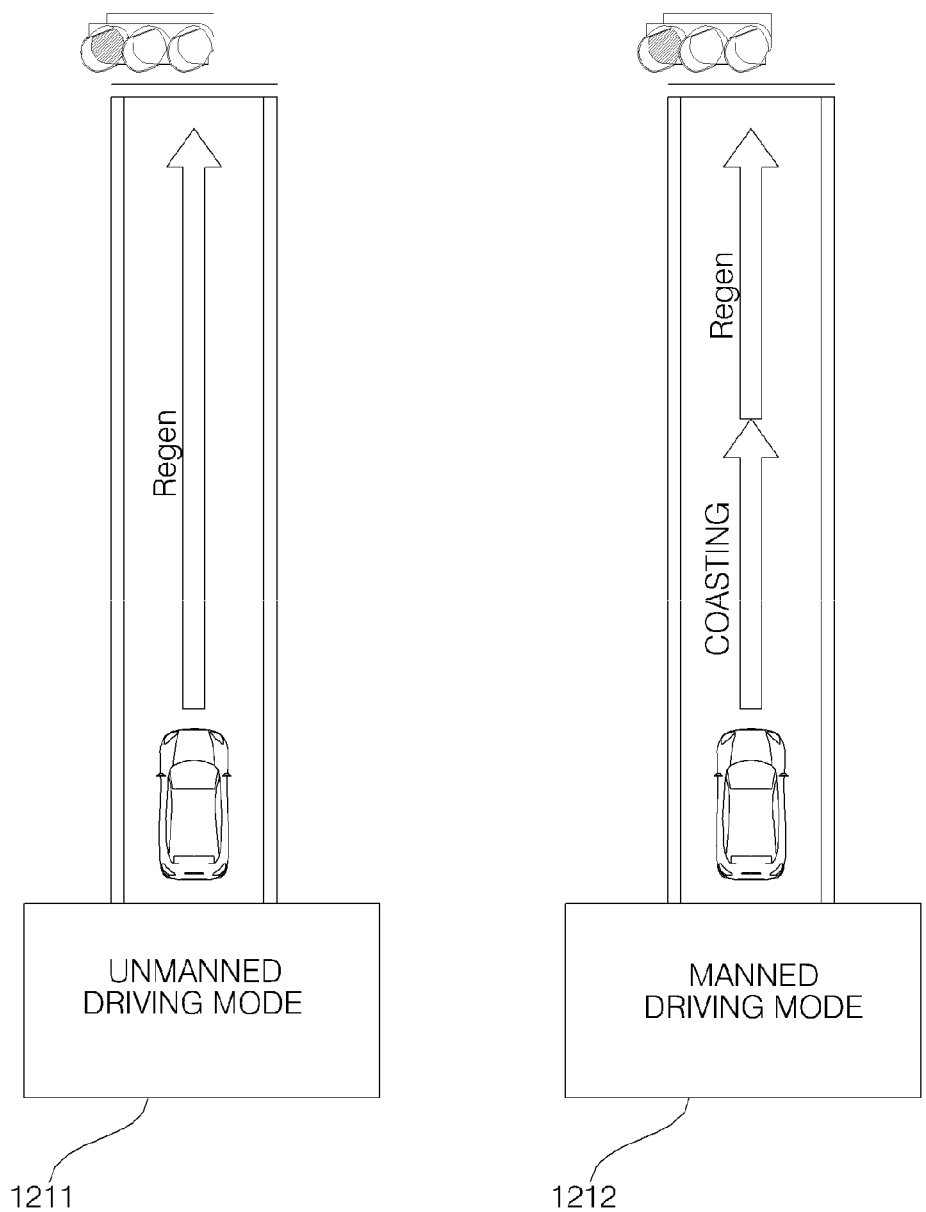

FIGS. 12A and 12B are diagrams of an operation of determining a regenerative braking start point based on driving mode information, according to some implementations.

Referring to FIG. 12A, the vehicle 100 may operate in at least one selected by a user from among an eco mode, a comfort mode, or a sport mode.

In this case, a braking method may be changed for each driving mode. In particular, regenerative braking may be controlled based on each driving mode.

For example, when the vehicle 100 travels in an eco mode 1201, a regenerative braking start time or a regenerative braking start point may be determined so as to recover more energy through a regenerative braking operation than when being in a comfort mode 1202 and a sport mode 1203.

In another example, when the vehicle 100 travels in the comfort mode 1202, a regenerative braking start time and a regenerative braking start point may be determined so as to minimize a sense of incompatibility caused by inertia for the purpose of improvement in ride comfort.

In yet another example, when the vehicle 100 travels in the sport mode 1203, a regenerative braking start time or a regenerative braking start point may be determined so as to drive dynamically.

Referring to FIG. 12B, when the vehicle 100 is an autonomous vehicle, the vehicle 100 may travel in an unmanned driving mode 1211 or a manned driving mode 1212.

In this case, a braking method may be changed for each driving mode. In particular, regenerative braking may be controlled based on each driving mode.

In a case where the vehicle 100 travels in the unmanned driving mode, a regenerative braking start time and a regenerative braking start point may be determined so as to recover the maximum amount of electrical energy through a regenerative braking operation. For example, when an acceleration input is less than a threshold or a brake input is greater than a threshold, the processor 870 may perform control so that the regenerative braking is performed immediately.

In a case where the vehicle 100 travels in the manned driving mode, a regenerative braking start time or a regenerative braking start point may be determined so as to minimize a sense of incompatibility caused by inertia for the purpose of improvement in ride comfort, in the same way as in the comfort mode 1202.

Figure 13:
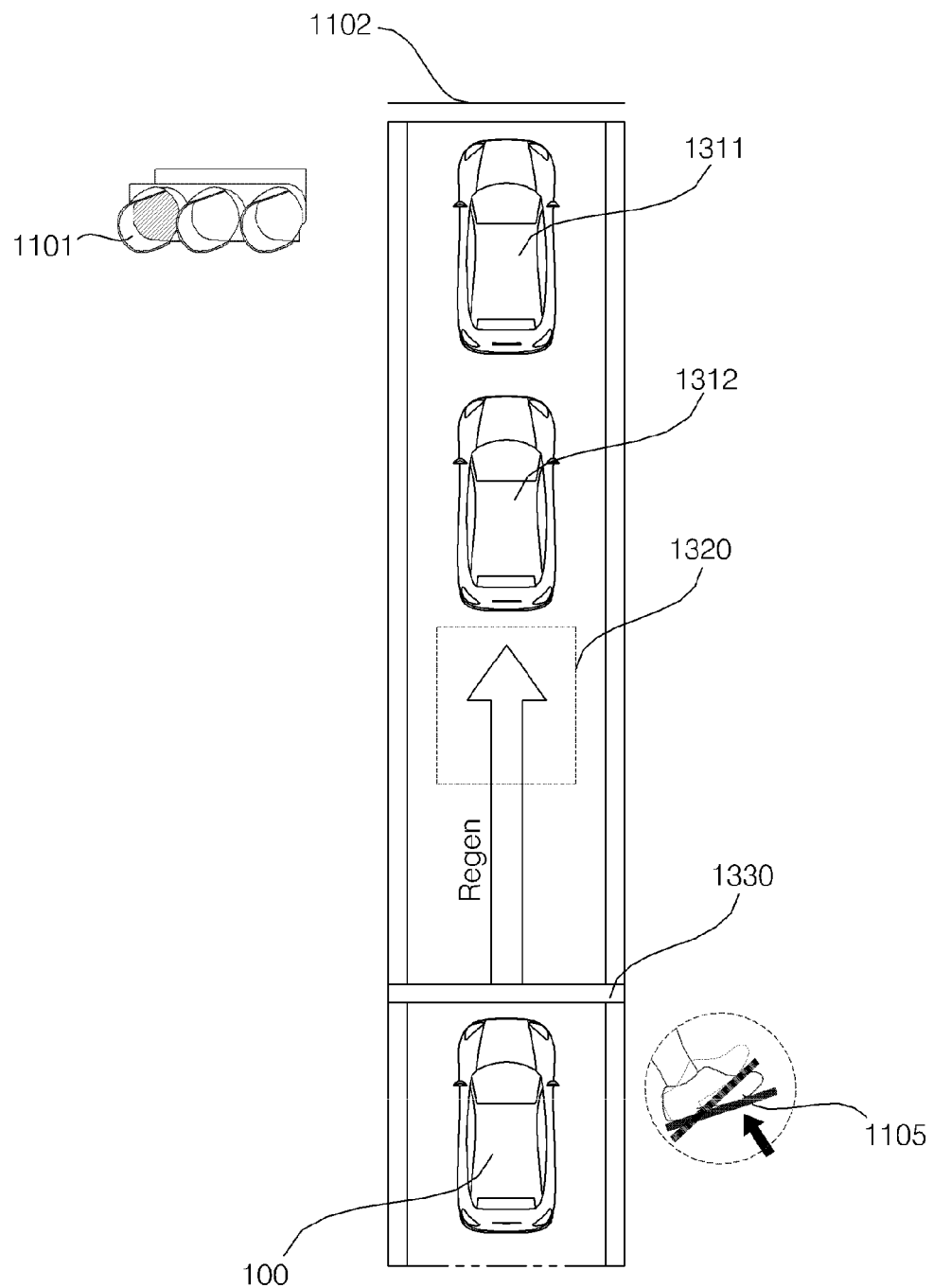
FIG. 13 is a diagram illustrating an example of a regenerative braking control operation when an obstacle is located between a vehicle and a stop line, according to some implementations.

FIG. 13 is a diagram of a regenerative braking control operation when an obstacle is located between a vehicle and a stop line, according to some implementations.

Referring to FIG. 13, the processor 870 may receive speed information of the vehicle 100 through an interface unit 830.

The processor 870 may acquire, through an object detection device 300, information on a signal 1101 displayed on a traffic lamp, and/or information on a stop line 1102 marked on the road.

In some implementations, the processor 870 may acquire, through the object detection device 300, information on obstacles 1311 and 1312 located between the vehicle 100 and the stop line 1102. In FIG. 13, the obstacle is a nearby vehicle, but the obstacle may be other types of objects, such as a pedestrian or a two-wheeled vehicle, which may be present on a road.

The processor 870 may receive accelerator-off information (e.g., accelerator input is less than a threshold) or brake-on information (e.g., brake input is greater than a threshold) at the current location of the vehicle 100.

The processor 870 may determine whether to perform regenerative braking, based on the speed information of the vehicle 100, the information on the signal 1101 displayed on the traffic lamp, the information on the stop line 1102, and the information on the obstacles 1131 and 1132. The processor 870 may provide a signal corresponding to a result of the determination to the regenerative braking system 900.

The processor 870 may determine a stop point 1320 of the vehicle 100 based on the speed information of the vehicle 100, the information on the signal 1101 displayed on the traffic lamp, the information on the stop line 1102, and the information on the obstacles 1131 and 1132.

The processor 870 may acquire information on the distance to the stop point 1320 (or information on the distance to the obstacle 1312).

Based on the vehicle speed information of the vehicle 100 and the information on the distance to the stop point 1320 (or information on the distance to the obstacle 1312), the processor 870 may determine a braking distance and a required braking force in order for the vehicle 100 to stop at the stop point 1320.

The processor 870 may determine a regenerative braking start point 1330 based on the determined braking distance and the determined required braking force. In addition, the processor 870 may determine a regenerative braking start time, by considering a relationship of distance, speed, and time.

When the vehicle 100 is not located at the determined regenerative braking start point 1330, the processor 870 may control regenerative braking not to be performed despite the accelerator input being less than a threshold (e.g., accelerator pedal being stepped off) or the brake input being greater than a threshold (e.g., brake pedal being stepped on). In this case, the vehicle 100 may be caused to coast.

When the vehicle 100 is located at the determined regenerative braking start point 1330, the processor 870 may control regenerative braking to be performed with the accelerator input being less than a threshold (e.g., accelerator pedal being stepped off) or the brake input being greater than a threshold (e.g., brake pedal being stepped on).

Figure 14A:
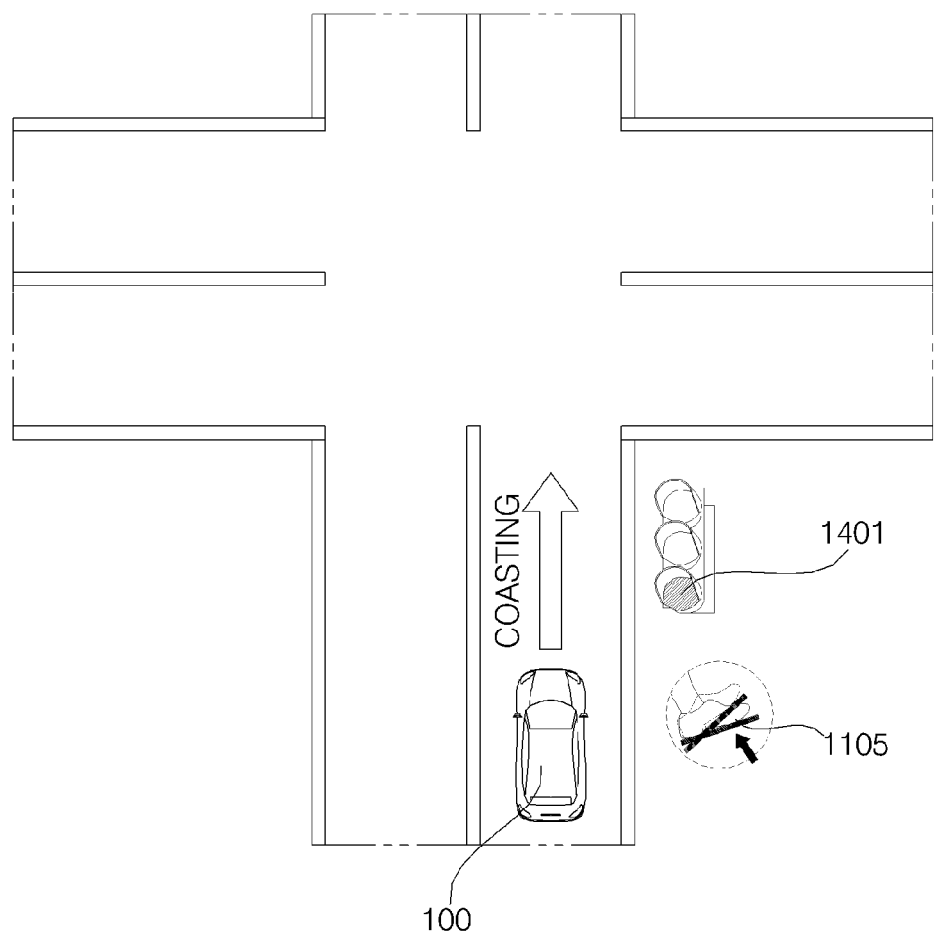
FIGS. 14A and 14B are diagrams illustrating examples of a regenerative braking control operation when there is an obstacle interfering with driving a vehicle, according to some implementations.
Figure 14B:
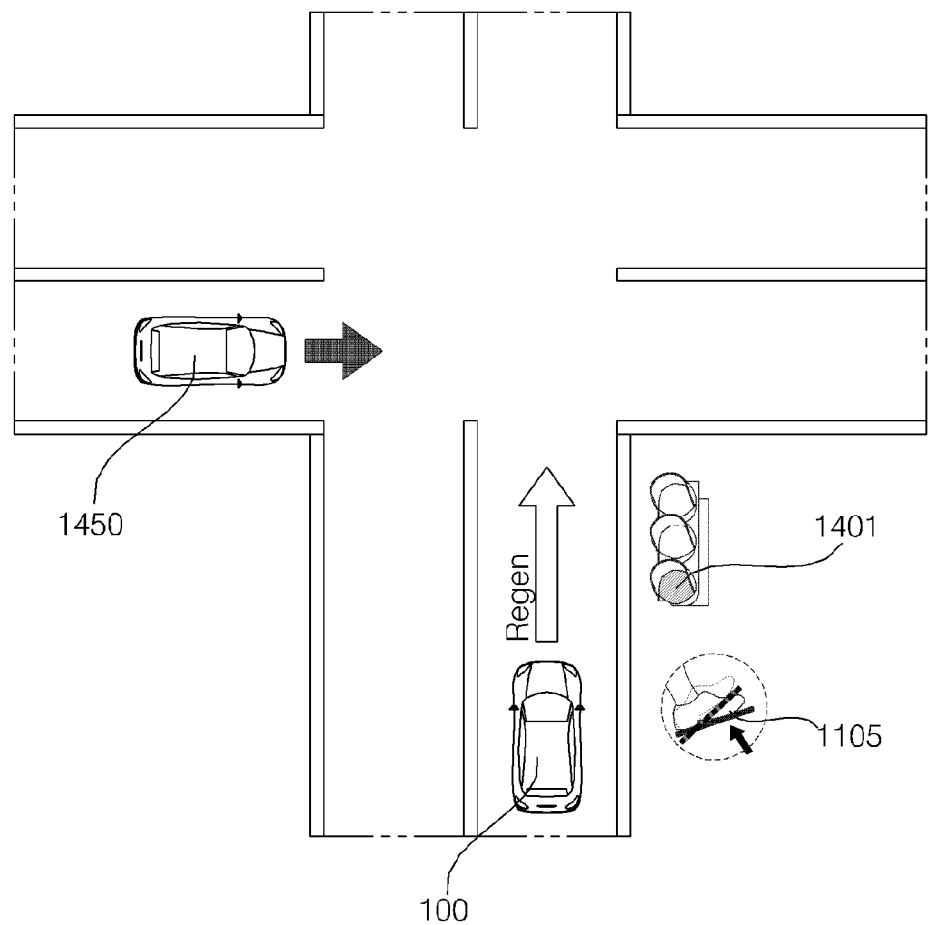

FIGS. 14A and 14B are diagrams of a regenerative braking control operation when there is an obstacle interfering with driving a vehicle, according to some implementations.

As illustrated in FIG. 14A, when information on a traffic signal (a "Go" signal) 1401 displayed on a traffic lamp is acquired when a vehicle 100 is about to enter an intersection, the processor 870 may determine not to perform regenerative braking despite the accelerator input being less than a threshold (e.g., accelerator pedal being stepped off) or the brake input being greater than a threshold (e.g., brake pedal being stepped on).

As illustrated in FIG. 14B, in a case where information on an obstacle 1450 interfering with driving of the vehicle 100 is acquired in the same situation as shown in FIG. 14A, the processor 870 may determine to perform regenerative braking.

Here, the obstacle 1450 may be a nearby preceding vehicle that intervenes the lane of the vehicle 100. For example, the obstacle 1450 may be a vehicle that is travelling in the direction intersecting the direction in which the vehicle 100 is travelling at an intersection. In such scenarios, even if the traffic signal (a "Go" signal) 1401 displayed on a traffic lamp is acquired, the processor 870 may perform regenerative braking, based on detecting the interfering vehicle 1450, and thus avoid a potential accident with the vehicle 1450.

FIGS. 15 to 18B are diagrams of a regenerative braking control operation when it is determined that a vehicle is in a state of continuing travel, according to some implementations.

Even in a case where the accelerator input is below a threshold (e.g., accelerator pedal is stepped off) or the brake input is above a threshold (e.g., brake pedal is stepped on), the processor 870 may determine that the vehicle 100 is in a state of continuing travel, based on driving information and/or object information.

The driving information may include navigation information. The object information may include information on a signal displayed on a traffic lamp.

Figure 15:
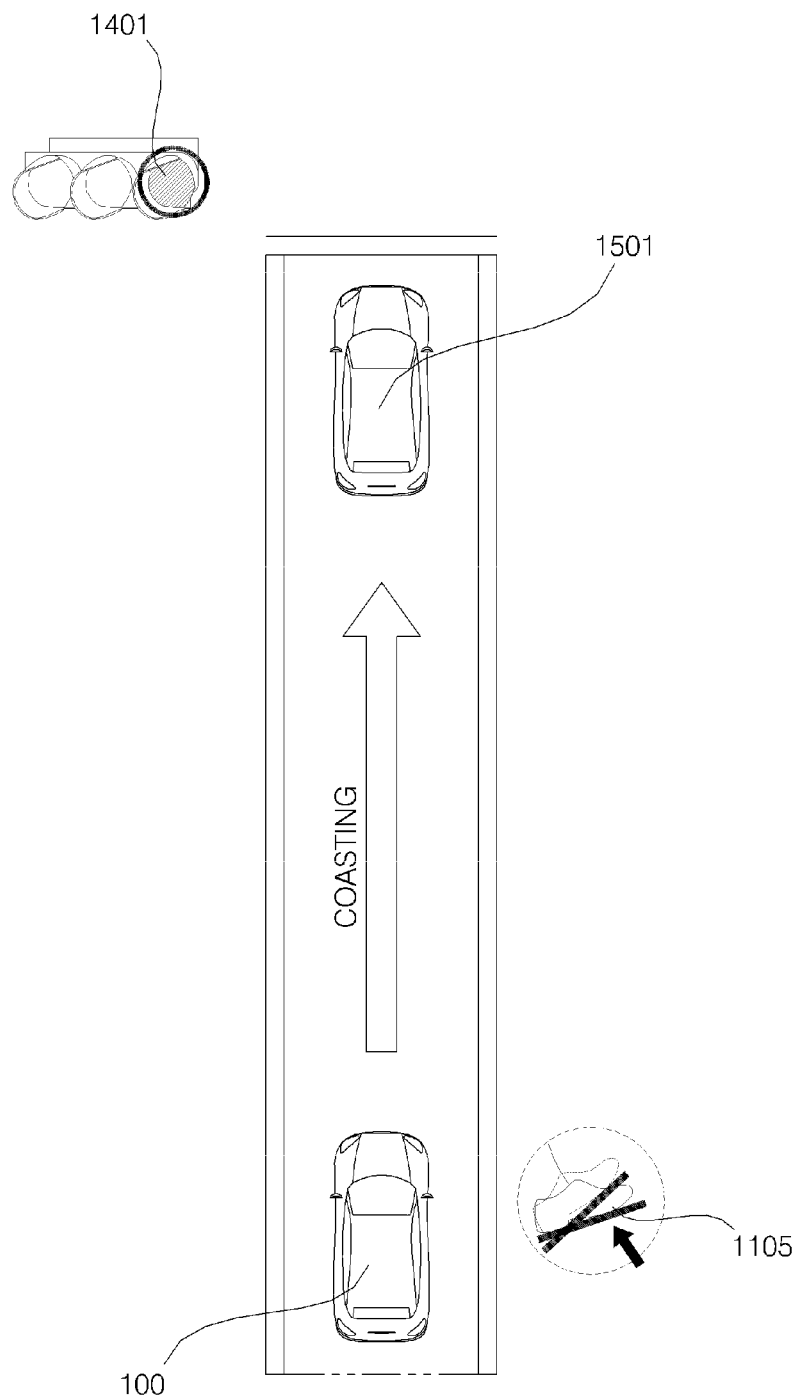
FIGS. 15 to 18B are diagrams illustrating examples of a regenerative braking control operation when a vehicle is in a state of continuing travel, according to some implementations.

As illustrated in FIG. 15, the processor 870 may acquire traffic signal information (e.g., a straight "Go" signal) 1401 of a traffic lamp.

A user may reduce an accelerator input (e.g., step off an accelerator pedal) and increase a brake input (e.g., step on a brake pedal) because of a nearby preceding vehicle 1501 travelling in a lane on which the vehicle 100 is travelling. At this point, even in a case where the accelerator input is decreased or the brake input is increased, the processor 870 may determine that the vehicle 100 is in a state of continuing travel, based on the traffic signal information 1401 of the traffic lamp indicating a "Go" signal. As such, the processor 870 may determine not to perform regenerative braking in the same situation, allowing the vehicle 100 to coast.

Figure 16:
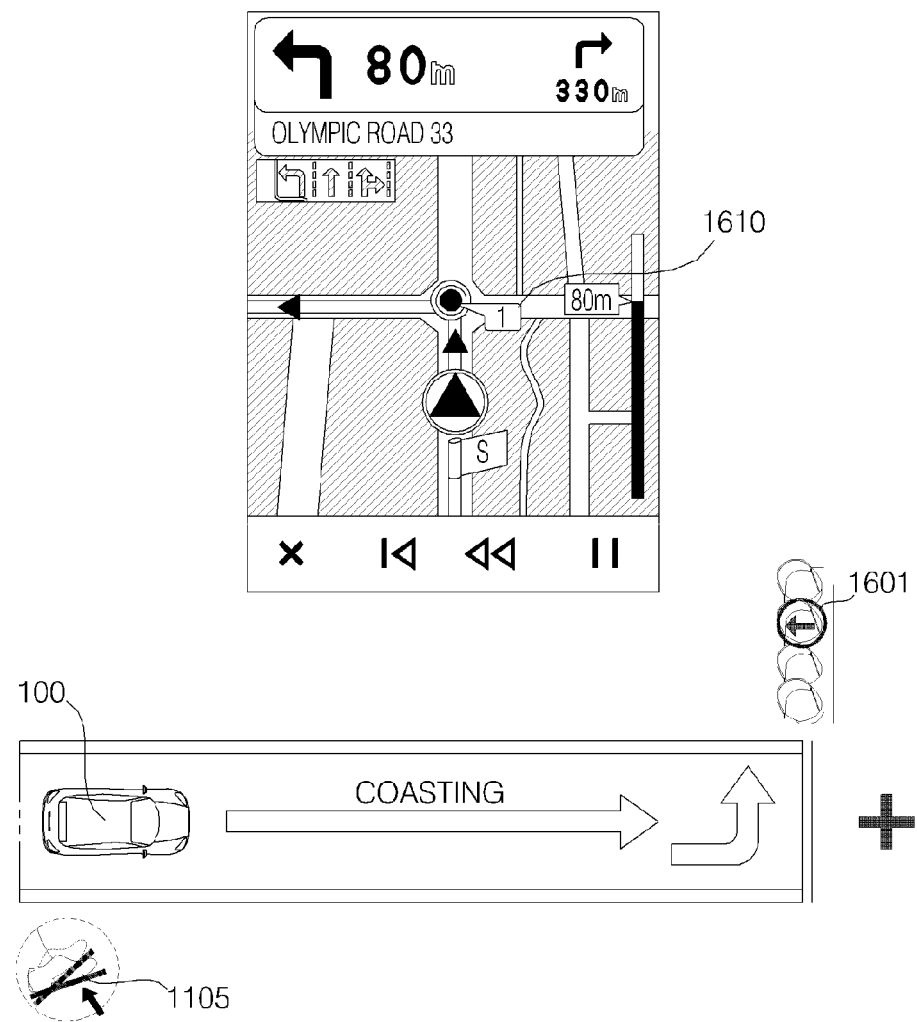

As illustrated in FIG. 16, the processor 870 may acquire traffic signal information (a left-turn "Go" signal) 1601 of a traffic lamp. The processor 870 may receive route information on making a left turn 1610 or a right turn at an intersection located within a predetermined distance from the vehicle 100.

A user may reduce an accelerator input (e.g., step off an accelerator pedal) and increase a brake input (e.g., step on a brake pedal) to make a left turn or a right turn at an intersection. At this point, in a case where the accelerator input is decreased or the brake input is increased in a state in which the vehicle will make a left turn or a right turn at the intersection, the processor 870 may determine that the vehicle 100 is in a state of continuing travel, based on the traffic signal information 1601 of the traffic lamp and the route information on making the left turn 1610. As such, the processor 870 may determine not to perform regenerative braking in the same situation, allowing the vehicle 100 to coast.

Figure 17A:
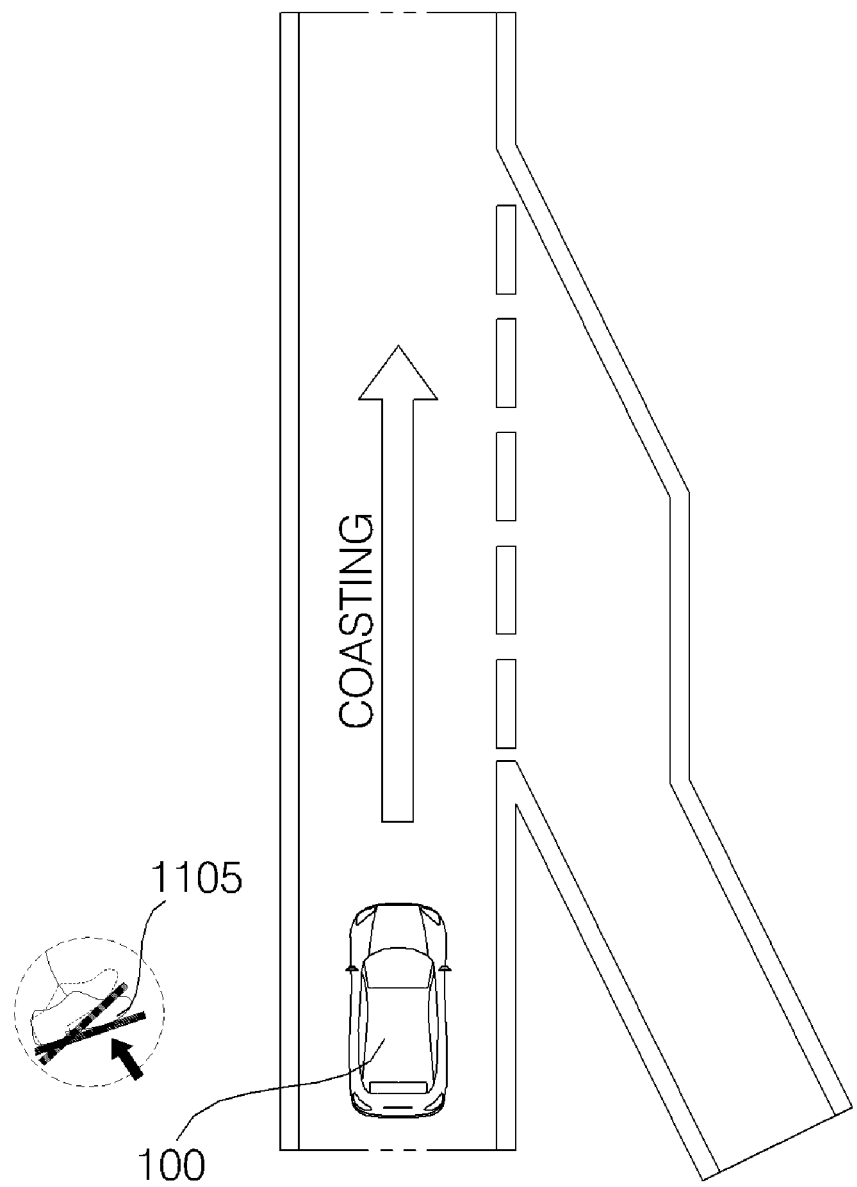

As illustrated in FIG. 17A, the processor 870 may receive information on a merging point located within a predetermined distance from the vehicle 100.

At the merging point, a user may reduce an accelerator input (e.g., step off an accelerator pedal) and increase a brake input (e.g., step on a brake pedal) in order to reduce the speed of the vehicle 100. At this point, if information on detection of a nearby vehicle merging at the merging point is not acquired in the state where the accelerator input is reduced or the brake input is increased, then the processor 870 may determine that the vehicle 100 is in a state of continuing travel. As such, the processor 870 may determine not to perform regenerative braking in the same situation, allowing the vehicle 100 to coast.

Figure 17B:
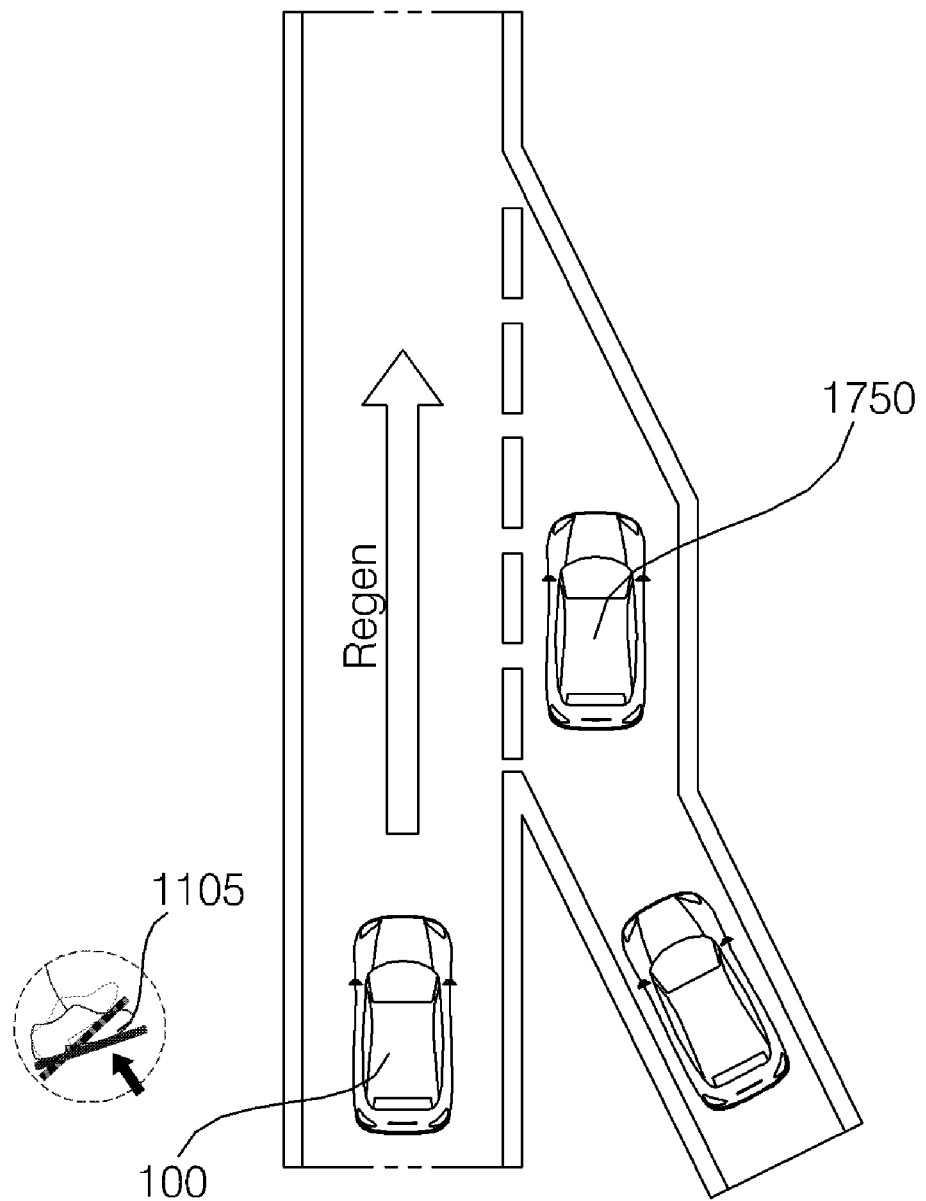

As illustrated in FIG. 17B, the processor 870 may receive information on a merging point located within a predetermined distance from the vehicle 100.

The processor 870 may acquire information on detection of a nearby vehicle 1750 through the object detection device 300.

Here, the nearby vehicle 1750 may be a nearby preceding vehicle which is anticipated to merge into the lane of the vehicle 100 at a merging point in front of the vehicle 100.

At the merging point, a user may reduce an accelerator input (e.g., step off an accelerator pedal) and increase a brake input (e.g., step on a brake pedal) in order to reduce the speed of the vehicle 100. At this point, if information on detection of the nearby vehicle 1750 anticipated to merge at the merging point is acquired in the state in which the accelerator input is decreased or the brake input is increased, then the processor 870 may determine to perform braking. As such, the processor 870 may determine to perform regenerative braking in the same situation, to actively slow the vehicle 100.

Figure 18A:
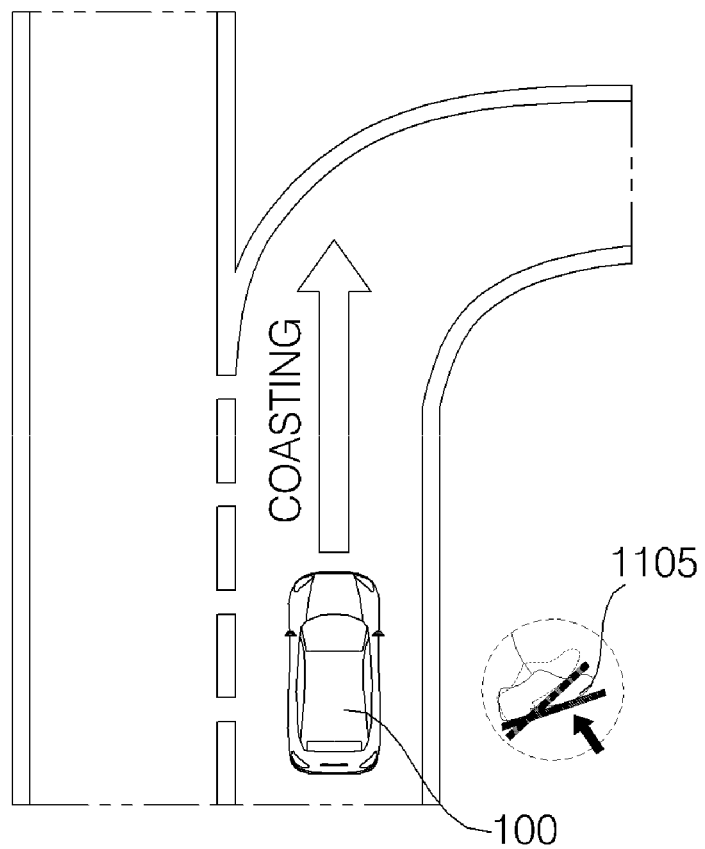

As illustrated in FIG. 18A, the processor 870 may receive information on a curve located within a predetermined distance from the vehicle 100.

The processor 870 may acquire curvature information of the curve. In a case where an accelerator input is reduced below a threshold (e.g., accelerator pedal is stepped off) or a brake input is increased beyond a threshold (e.g., brake pedal is stepped on) while a curvature value of a curve is equal to or smaller than a reference value, the processor 870 may determine not to perform regenerative braking, allowing the vehicle 100 to coast.

That is, when the curve is gentle, the vehicle 100 is able to negotiate the curve safely without braking. In this case, it is possible to negotiate the curve by coasting without performing regenerative braking.

Figure 18B:
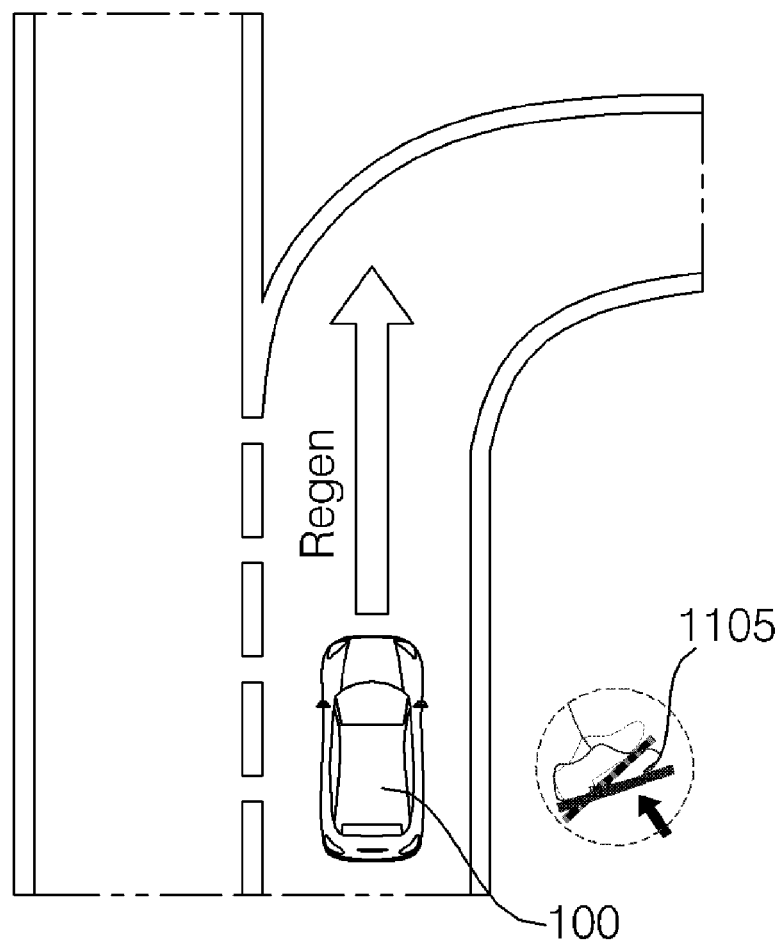

As illustrated in FIG. 18B, the processor 870 may receive information on a curve located within a predetermined distance from the vehicle 100.

The processor 870 may acquire curvature information of the curve. In the case where the accelerator input is decreased below a threshold (e.g., accelerator pedal is stepped off) or a brake input is increased beyond a threshold (e.g., brake pedal is stepped on) while a curvature value of the curve is greater than a reference value, the processor 870 may determine to perform regenerative braking.

That is, when the curve is tight, the vehicle 100 should perform braking so as to negotiate the curve safely. In this case, the vehicle 100 is able to negotiate the curve by controlling the speed through regenerative braking.

Figure 19A:
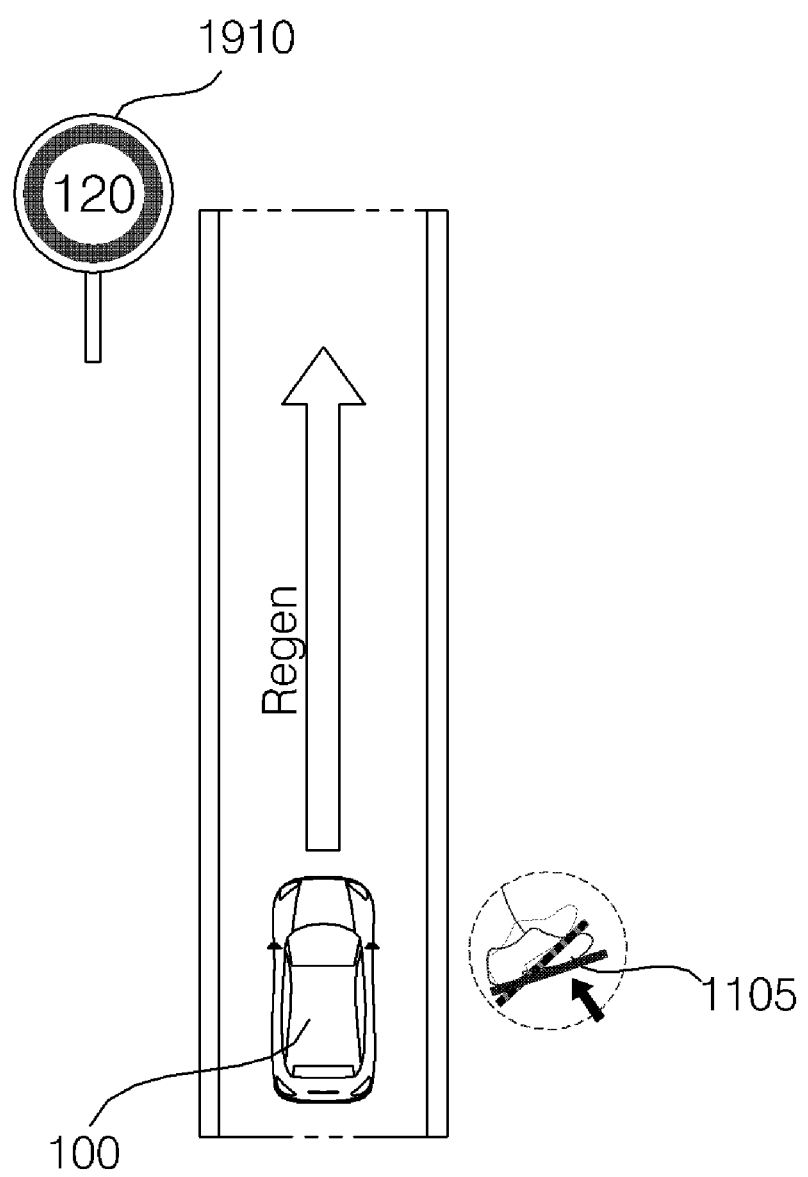
FIGS. 19A and 19B are diagrams illustrating examples of an operation of performing regenerative braking based on a speed limit, according to some implementations.
Figure 19B:
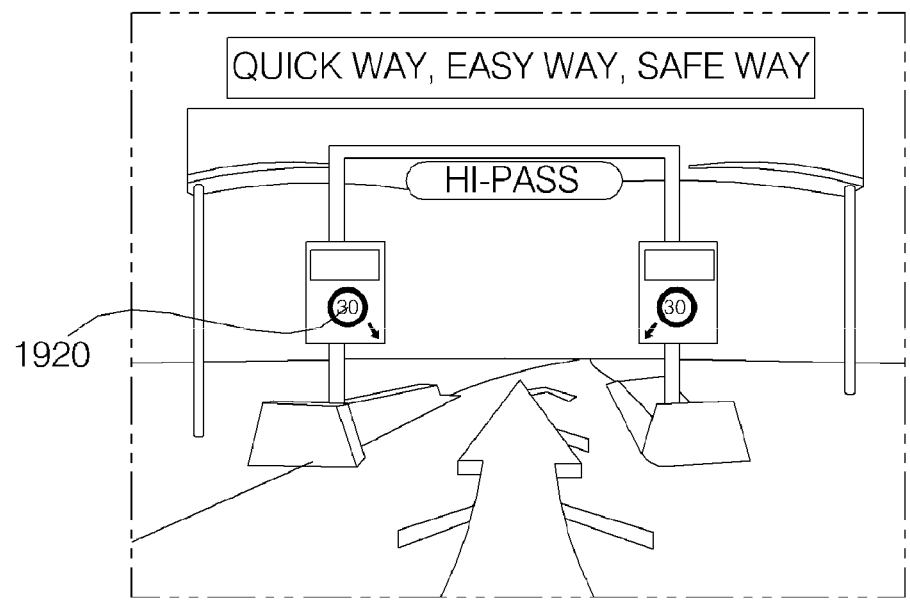

FIGS. 19A to 19B are diagrams of a regenerative braking operation based on speed limit, according to some implementations.

As illustrated in FIG. 19A, a processor 870 may acquire vehicle speed information of the vehicle 100. The processor 870 may also acquire information on a speed limit 1910 of a road on which the vehicle 100 is travelling, for example through the object detection device 300 or the navigation system 770.

The processor 870 may determine whether to perform regenerative braking, based on the vehicle speed information and the information on the speed limit 1910.

When the speed of the vehicle 100 is greater than the speed limit 1910, the vehicle 100 may be braked so as to travel at a speed equal to or less than the speed limit 1910. In this case, by performing regenerative braking, the processor 870 may control the vehicle 100 to travel at a speed equal to or less than the speed limit 1910. As such, when the speed of the vehicle 100 is greater than the speed limit, the processor 870 may determine to perform regenerative braking.

As illustrated in FIG. 19B, the processor 870 may acquire information regarding an overpass that is over the road, referred to herein as hi-pass section information. The hi-pass section information may be acquired through the object detection device 300 or the navigation system 770. The hi-pass section information may include information on a hi-pass speed limit 1920, which is a speed limit through the overpass.

The vehicle 100 may be required to pass through a hi-pass section at a speed equal to or less than the hi-pass speed limit 1920. The processor 870 may determine whether to perform regenerative braking, based on the vehicle speed information and the information on the hi-pass speed limit 1920.

In a case where the vehicle 100 passes through the hi-pass section at a speed greater than the hi-pass speed limit 1920, the vehicle 100 may be braked so as to travel at a speed equal to or less than the hi-pass speed limit 1920. In this case, by performing regenerative braking, the processor 870 may control the vehicle 100 to travel at a speed equal to or less than the hi-pass speed limit 1920. As such, in a case where the speed of the vehicle 100 is greater than the hi-pass speed limit, the processor 870 may determine to perform regenerative braking.

Figure 20A:
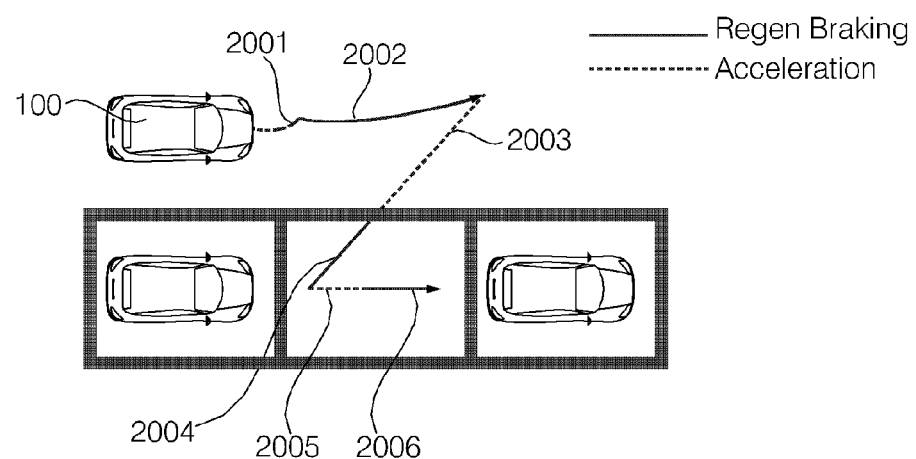
FIGS. 20A to 20B are diagrams illustrating examples of a regenerative braking control operation in a parking situation according to some implementations.
Figure 20B:
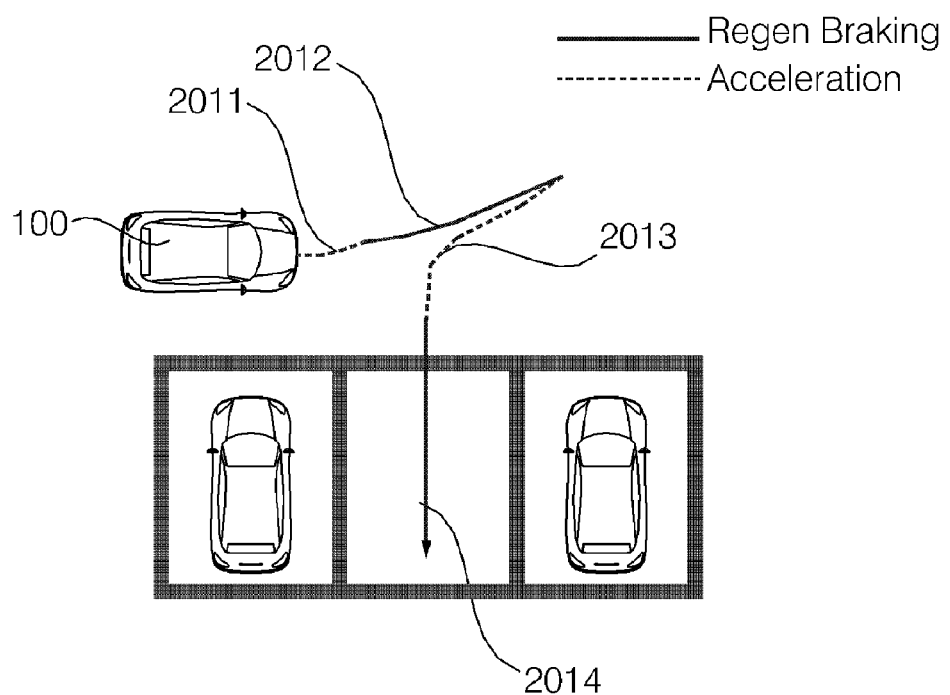

FIGS. 20A and 20B are diagrams of a regenerative braking control operation in a parking situation according to some implementations.

FIG. 20A shows an example in which the vehicle 100 is performing parallel parking, and FIG. 20B shows an example in which the vehicle 100 is performing perpendicular parking.

Referring to the drawings, the processor 870 may acquire parking situation information. When the vehicle 100 reduces the speed to be parked, the processor 870 may determine to perform regenerative braking.

In a parking situation, a vehicle 100 moves forward and backward several times and may perform braking between the forward and backward movement. When the vehicle 100 is braked for a parking operation, the processor 870 may determine to perform regenerative braking.

As illustrated in FIG. 20A, to perform parallel parking, the vehicle 100 moves forward in a first section 2001 by receiving power from a power source. Then, the vehicle 100 is braked in a second section 2002. At this point, the processor 870 may control regenerative braking to be performed. Then, the vehicle 100 moves backward in a third section 2003 by receiving power from the power source. Then, the vehicle 100 is braked in a fourth section 2004. At this point, the processor 870 may control regenerative braking to be performed. Then, the vehicle 100 moves forward in a fifth section 2005 by receiving power from the power source. Then, the vehicle 100 is braked in a sixth section 2006. At this point, the processor 870 may control regenerative braking to be performed. In this manner, the vehicle 100 may complete the parallel parking.

As illustrated in FIG. 20B, to perform perpendicular parking, the vehicle 100 moves forward in a first section 2011 by receiving power from a power source. Then, the vehicle 100 is braked in a second section 2012. At this point, the processor 870 may control regenerative braking to be performed. Then, the vehicle 100 may move backward in a third section 2013 by receiving power from the power source. Then, the vehicle 100 is braked in a fourth section 2014. At this point, the processor 870 may control regenerative braking to be performed. In this manner, the vehicle 100 may complete the perpendicular parking.

Figure 21A:
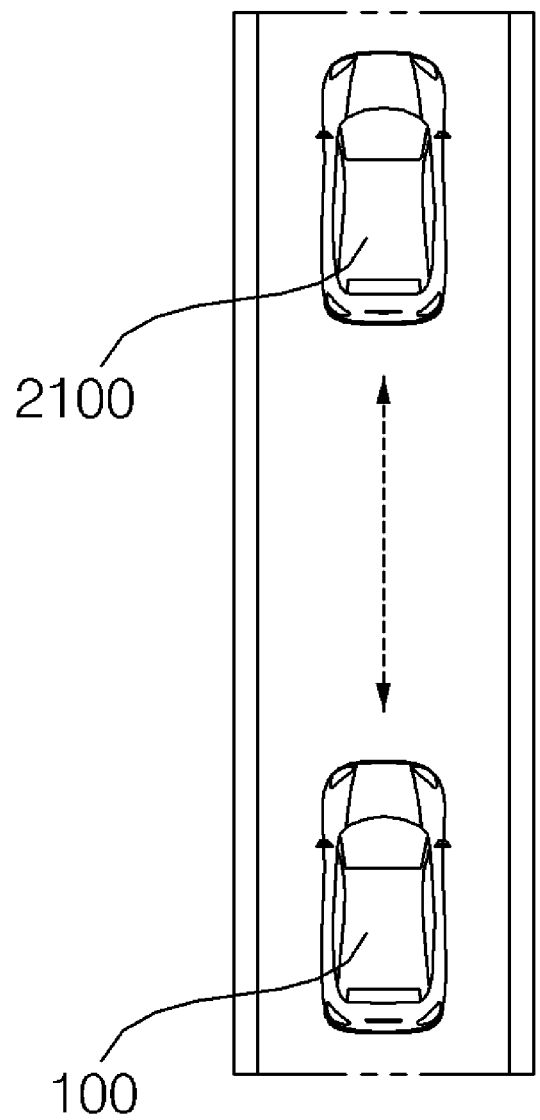
FIGS. 21A and 21B are diagrams illustrating examples of a regenerative braking control operation based on a function of an advanced driver assistance device, according to some implementations.
Figure 21B:
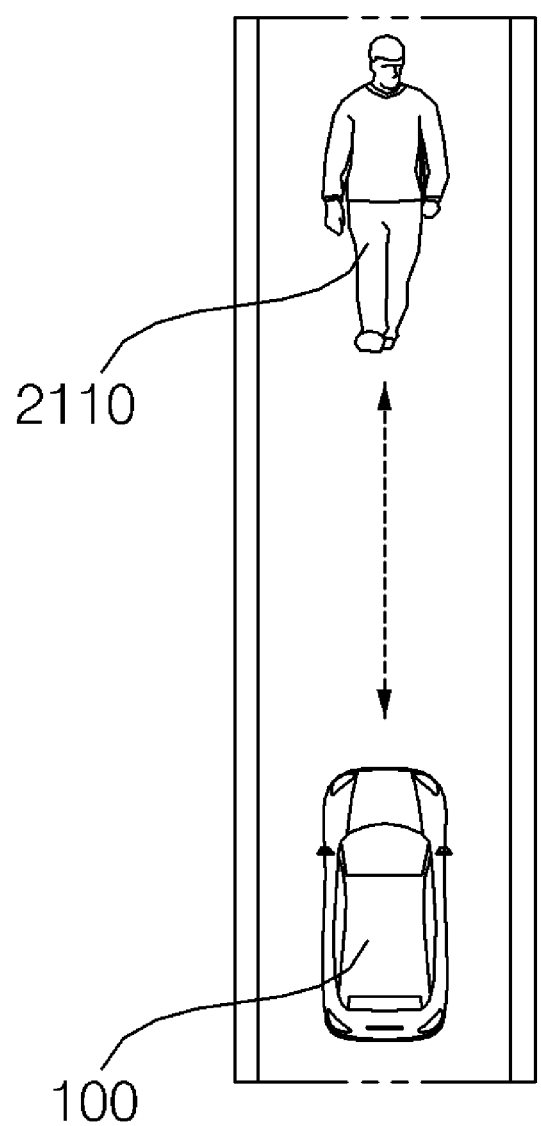

FIGS. 21A and 21B are diagrams of a regenerative braking control operation based on a function of an advanced driver assistance device, according to some implementations.

A processor 870 may determine whether to perform regenerative braking, based on a function of the advanced driver assistance device.

The advanced driver assistance device may perform an Adaptive Cruise Control (ACC) function and an Autonomous Emergency Braking (AEB) function.

As illustrated in FIG. 21A, the processor 870 may determine whether to perform regenerative braking, based on the ACC function.

The processor 870 may acquire ACC-on state information.

In the ACC-on state, when a nearby vehicle 2100 is travelling within a predetermined distance before the vehicle 100, the advanced driver assistance device keeps the distance between the vehicle 100 and the nearby vehicle 2100 at a preset distance that is set in advance. When the vehicle 100 decelerates in order to adjust the distance between the vehicle 2100 and the nearby vehicle 2100, the processor 870 may control regenerative braking to be performed.

In some implementations, the nearby vehicle 2100 may be referred to as a following vehicle.

In the ACC-on state, when there is no nearby vehicle ahead of the vehicle 100, the advanced driver assistance device controls the vehicle 100 to travel at the speed that is set in advance. When the vehicle 100 decelerates to travel at the preset speed, the processor 870 may control regenerative braking to be performed.

As illustrated in FIG. 21B, the processor 870 may determine whether to perform regenerative braking, based on the AEB function.

The processor 870 may acquire AEB-on state information.

In the AEB-on state, when braking is required to avoid collision with an object 2110 ahead of the vehicle 100, the processor 870 may control regenerative braking to be performed.

Implementations described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations may be made within the spirit and scope of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses also may be applied.

What is claimed is:

1. A regenerative braking control apparatus for an autonomous vehicle, comprising:
    an interface unit configured to receive driving information of a vehicle, wherein the interface unit comprises a port configured for passage of data;
    an object detection device configured to generate object information based on detecting an object outside the vehicle, wherein the object detection device comprises at least one of a camera, a radar, an ultrasonic sensor, or an infrared sensor; and
    at least one processor configured to:
        determine whether to perform regenerative braking for the vehicle, based on the driving information and the object information; and
        provide at least one signal corresponding to a result of determining whether to perform the regenerative braking for the vehicle,
    wherein the at least one processor is further configured to:
        receive, through the interface unit, driving mode information; and based on a determination to perform regenerative braking:
   determine a regenerative braking start location based on the driving mode information; and
   determine a regenerative braking start time based on whether the vehicle travels in an unmanned driving mode or a manned driving mode.

2. The regenerative braking control apparatus according to claim 1, wherein the at least one processor is configured to:
   based on the determination to perform regenerative braking, determine a regenerative braking end time, a regenerative braking end location, a degree of regenerative braking, and whether the degree of regenerative braking has been changed; and
   provide a first signal, among the at least one signal, corresponding to a result of determining the regenerative braking start time, the regenerative braking start location, the regenerative braking end time, the regenerative braking end location, the degree of regenerative braking, and whether the degree of regenerative braking has been changed.

3. The regenerative braking control apparatus according to claim 1, wherein:
   the driving information comprises at least one of vehicle speed information, vehicle route information, or vehicle location information,
   the object information comprises information regarding at least one of a traffic lamp, a traffic sign, or a traffic marker on a road surface, and
   the at least one processor is configured to determine, based on the vehicle speed information, the vehicle route information, the vehicle location information, and the object information, whether the vehicle is in a state of continuing travel with an acceleration input below a first threshold or a brake input above a second threshold.

4. The regenerative braking control apparatus according to claim 3, wherein the traffic marker on the road surface comprises a stop line, and the at least one processor is configured to determine a stop location of the vehicle based on information regarding the stop line.

5. The regenerative braking control apparatus according to claim 4, wherein the at least one processor is configured to:
   acquire information regarding a distance between the vehicle and the stop location; and
   determine the regenerative braking start location further based on the vehicle speed information and the information regarding the distance between the vehicle and the stop location.

6. The regenerative braking control apparatus according to claim 4, wherein the at least one processor is configured to:
   acquire information regarding an object located between the vehicle and the stop line; and
   determine the stop location of the vehicle further based on the information regarding the object located between the vehicle and the stop line.

7. The regenerative braking control apparatus according to claim 6, wherein the at least one processor is configured to:
   acquire information regarding a distance between the vehicle and the object located between the vehicle and the stop line; and
   determine the regenerative braking start location further based on the vehicle speed information and the information regarding the distance between the vehicle and the object located between the vehicle and the stop line.

8. The regenerative braking control apparatus according to claim 3, where the at least one processor is configured to determine to perform regenerative braking, in a state in which information regarding an object interfering with driving of the vehicle is acquired and traffic signal information of the traffic lamp is acquired.

9. The regenerative braking control apparatus according to claim 3, wherein:
   the vehicle route information comprises route information regarding a left turn or a right turn at an intersection located within a first distance from the vehicle; and
   the at least one processor is configured to determine not to perform regenerative braking, based on the acceleration input being less than the first threshold or the brake input being greater than the second threshold and based on a determination that the vehicle is allowed to make a left turn or a right turn at the intersection.

10. The regenerative braking control apparatus according to claim 3, wherein:
    the vehicle route information comprises information regarding a merging location located within a first distance from the vehicle; and
    the at least one processor is configured to determine not to perform regenerative braking, based on the acceleration input being less than the first threshold or the brake input being greater than the second threshold and based on not having acquired information regarding detection of a second vehicle merging at the merging location.

11. The regenerative braking control apparatus according to claim 10, wherein the at least one processor is configured to determine to perform regenerative braking, based on the acceleration input being less than the first threshold or the brake input being greater than the second threshold and based on having acquired the information regarding the detection of the second vehicle merging at the merging location.

12. The regenerative braking control apparatus according to claim 3, wherein:
    the vehicle route information comprises information regarding a curve in a road located within a first distance from the vehicle; and
    the at least one processor is configured to:
    acquire curvature information of the curve; and
    determine not to perform regenerative braking, based on the acceleration input being less than the first threshold or the brake input being greater than the second threshold and based on the curvature of the curve being less than or equal to a threshold curvature value.

13. The regenerative braking control apparatus according to claim 12, wherein the at least one processor is configured to determine to perform regenerative braking, based on the acceleration input being less than the first threshold or the brake input being greater than the second threshold and based on the curvature of the curve being greater than the threshold curvature value.

14. The regenerative braking control apparatus according to claim 1, wherein:
    the driving information comprises vehicle speed information; and
    the at least one processor is configured to:
    acquire information regarding a speed limit of a road on which the vehicle is travelling; and determine whether to perform regenerative braking, based on the vehicle speed information and the information regarding the speed limit.

15. The regenerative braking control apparatus according to claim 14, wherein the at least one processor is configured to determine to perform regenerative braking, based on the vehicle travelling at a speed greater than the speed limit.

16. The regenerative braking control apparatus according to claim 1, wherein:
the driving information comprises parking situation information; and
the at least one processor is configured to determine to perform regenerative braking, based on the vehicle decelerating and based on the parking situation information indicating that the vehicle performs a parking operation.

17. The regenerative braking control apparatus according to claim 1, wherein:
the driving information comprises Adaptive Cruise Control (ACC)-on state information; and
the at least one processor is configured to determine to perform regenerative braking, based on the vehicle decelerating in an ACC-on state according to the ACC-on state information.

18. The regenerative braking control apparatus according to claim 1, wherein:
the driving information comprises Autonomous Emergency Braking (AEB)-on state information; and
the at least one processor is configured to determine to perform regenerative braking based on vehicle being in an AEB-on state according to the AEB-on state information.

19. The regenerative braking control apparatus according to claim 1, wherein the at least one processor is further configured to determine not to perform regenerative braking, based on a determination that the vehicle is in a state of continuing travel with the acceleration input being less than a first threshold or the brake input being greater than a second threshold.

* * * * *